(12) United States Patent
Pezeshki et al.

(10) Patent No.: US 12,058,532 B2
(45) Date of Patent: Aug. 6, 2024

(54) ESTIMATING FEATURES OF A RADIO FREQUENCY BAND BASED ON AN INTER-BAND REFERENCE SIGNAL

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US); Taesang Yoo, San Diego, CA (US); Junyi Li, Franklin Park, NJ (US); Jingchao Bao, San Diego, CA (US); Arumugam Chendamarai Kannan, San Diego, CA (US); Juan Montojo, San Diego, CA (US); Qiang Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/306,849

(22) Filed: May 3, 2021

(65) Prior Publication Data

US 2021/0344469 A1    Nov. 4, 2021

Related U.S. Application Data

(60) Provisional application No. 63/019,687, filed on May 4, 2020, provisional application No. 63/019,900, filed
(Continued)

(51) Int. Cl.
*H04W 16/28* (2009.01)
*G06N 20/00* (2019.01)
(Continued)

(52) U.S. Cl.
CPC ............ *H04W 16/28* (2013.01); *G06N 20/00* (2019.01); *H04L 5/0048* (2013.01);
(Continued)

(58) Field of Classification Search
None
See application file for complete search history.

(56) References Cited

U.S. PATENT DOCUMENTS 9,337,969 B2    5/2016  Raghavan et al.
10,075,930 B2 *  9/2018  Sorrentino ........ H04W 56/0025
(Continued)

FOREIGN PATENT DOCUMENTS

AU    2019451789 A1 * 12/2021 ............. H04B 17/24
CN    103535096 A      1/2014
(Continued)

OTHER PUBLICATIONS

ShareTechNote, "5G/NR-QCL/TCI", Jan. 30, 2020, https://web.archive.org/web/20200130180439/https://www.sharetechnote.com/html/5G/5G_QCL.html.*
(Continued)

*Primary Examiner* — Andrew C Oh
(74) *Attorney, Agent, or Firm* — Qualcomm Incorporated/Seyfarth Shaw LLP

(57) ABSTRACT

A method of wireless communication, by a user equipment (UE), includes receiving, from a first transmission and reception point (TRP) operating in a first band, assistance information comprising collocation information for both a second TRP operating in a second band and a communication node operating in the first band. The method also includes receiving, from the first TRP, configuration information for one or more reference signals (RSs) associated with the communication node. The method further includes communicating with the second TRP based on one or more
(Continued)

features of the second band estimated from the one or more RSs.

26 Claims, 13 Drawing Sheets

Related U.S. Application Data on May 4, 2020, provisional application No. 63/019,887, filed on May 4, 2020, provisional application No. 63/019,893, filed on May 4, 2020.

(51) Int. Cl.
*H04L 5/00* (2006.01)
*H04L 25/02* (2006.01)
*H04W 24/10* (2009.01)
*H04W 72/0453* (2023.01)
*H04W 72/23* (2023.01)

(52) U.S. Cl.
CPC ........ *H04L 5/0051* (2013.01); *H04L 25/0226* (2013.01); *H04W 24/10* (2013.01); *H04W 72/0453* (2013.01); *H04W 72/23* (2023.01)

(56) References Cited

U.S. PATENT DOCUMENTS

| | | | | |
|---|---|---|---|---|
| 11,115,840 | B2* | 9/2021 | Ro | H04W 36/0094 |
| 2006/0009227 | A1* | 1/2006 | Cudak | H04W 16/18 |
| | | | | 455/450 |
| 2010/0113019 | A1* | 5/2010 | Jeong | H04W 36/322 |
| | | | | 455/435.2 |
| 2010/0227603 | A1* | 9/2010 | Gupta | H04W 24/02 |
| | | | | 455/418 |
| 2012/0213261 | A1* | 8/2012 | Sayana | H04L 5/0094 |
| | | | | 375/224 |
| 2012/0263068 | A1* | 10/2012 | Morimoto | H04B 7/024 |
| | | | | 370/252 |
| 2012/0269278 | A1* | 10/2012 | Onggosanusi | H04B 7/0469 |
| | | | | 375/267 |
| 2012/0294249 | A1* | 11/2012 | Yu | H04B 7/0632 |
| | | | | 370/329 |
| 2013/0003788 | A1* | 1/2013 | Marinier | H04B 7/0626 |
| | | | | 375/219 |
| 2013/0039349 | A1* | 2/2013 | Ebrahimi Tazeh Mahalleh | |
| | | | | H04L 5/0048 |
| | | | | 370/336 |
| 2013/0051240 | A1* | 2/2013 | Bhattad | H04L 5/005 |
| | | | | 370/254 |
| 2013/0051317 | A1* | 2/2013 | Ji | H04W 24/02 |
| | | | | 370/328 |
| 2013/0083681 | A1* | 4/2013 | Ebrahimi Tazeh Mahalleh | |
| | | | | H04B 7/0626 |
| | | | | 370/252 |
| 2013/0242951 | A1* | 9/2013 | Lee | H04W 56/0045 |
| | | | | 370/336 |
| 2013/0286958 | A1* | 10/2013 | Liang | H04W 74/0833 |
| | | | | 370/329 |
| 2013/0286997 | A1* | 10/2013 | Davydov | H04W 56/0045 |
| | | | | 370/329 |
| 2013/0308474 | A1* | 11/2013 | Zhu | H04W 72/542 |
| | | | | 370/252 |
| 2013/0329660 | A1* | 12/2013 | Noh | H04L 5/0053 |
| | | | | 370/329 |
| 2013/0336224 | A1* | 12/2013 | Davydov | H04W 52/0251 |
| | | | | 370/328 |
| 2014/0023035 | A1* | 1/2014 | Zou | H04W 56/0045 |
| | | | | 370/350 |
| 2014/0119321 | A1* | 5/2014 | Wang | H04W 72/04 |
| | | | | 370/329 |
| 2014/0133448 | A1* | 5/2014 | Xu | H04L 5/0073 |
| | | | | 370/329 |
| 2014/0221038 | A1* | 8/2014 | Nakashima | H04L 5/0051 |
| | | | | 455/522 |
| 2014/0269579 | A1* | 9/2014 | Xu | H04W 52/146 |
| | | | | 370/329 |
| 2014/0293943 | A1* | 10/2014 | Yoon | H04L 27/2613 |
| | | | | 370/329 |
| 2015/0003407 | A1* | 1/2015 | Seo | H04L 25/0226 |
| | | | | 370/330 |
| 2016/0219619 | A1* | 7/2016 | Guo | H04W 72/23 |
| 2016/0227373 | A1* | 8/2016 | Tsai | G01S 5/0072 |
| 2016/0337805 | A1* | 11/2016 | Liao | H04W 8/005 |
| 2016/0345364 | A1* | 11/2016 | Uchino | H04L 1/0046 |
| 2017/0063503 | A1* | 3/2017 | Liu | H04L 5/0048 |
| 2017/0223662 | A1* | 8/2017 | Xu | H04W 48/08 |
| 2017/0331577 | A1* | 11/2017 | Parkvall | H04L 5/1469 |
| 2017/0331670 | A1* | 11/2017 | Parkvall | H04B 7/0617 |
| 2018/0092019 | A1* | 3/2018 | Yasukawa | H04W 40/14 |
| 2018/0115990 | A1* | 4/2018 | Abedini | H04L 27/2655 |
| 2018/0192404 | A1* | 7/2018 | Maaref | H04L 5/0044 |
| 2018/0206132 | A1 | 7/2018 | Guo et al. | |
| 2018/0302205 | A1 | 10/2018 | Abedini et al. | |
| 2018/0323887 | A1* | 11/2018 | Azarian Yazdi | H04W 24/08 |
| 2018/0324738 | A1 | 11/2018 | Stirling-Gallacher et al. | |
| 2018/0367382 | A1* | 12/2018 | Zhang | H04W 72/542 |
| 2019/0044677 | A1* | 2/2019 | Ly | H04B 7/088 |
| 2019/0045428 | A1* | 2/2019 | Huang | H04W 48/16 |
| 2019/0182693 | A1* | 6/2019 | Zhang | H04W 76/27 |
| 2019/0253909 | A1 | 8/2019 | Yiu et al. | |
| 2019/0260487 | A1 | 8/2019 | Kazmi et al. | |
| 2020/0100154 | A1 | 3/2020 | Cirik et al. | |
| 2020/0136708 | A1 | 4/2020 | Pan et al. | |
| 2020/0137831 | A1 | 4/2020 | Ma | |
| 2020/0153666 | A1* | 5/2020 | Khoshnevisan | H04L 5/0035 |
| 2020/0163139 | A1* | 5/2020 | Wang | H04W 8/08 |
| 2020/0187146 | A1 | 6/2020 | Stirling-Gallacher et al. | |
| 2020/0236064 | A1* | 7/2020 | Frankel | H04L 67/10 |
| 2020/0252821 | A1* | 8/2020 | Deogun | H04W 76/19 |
| 2020/0287633 | A1 | 9/2020 | Silverman et al. | |
| 2020/0396774 | A1* | 12/2020 | Thota | H04J 13/102 |
| 2021/0083784 | A1 | 3/2021 | Chae et al. | |
| 2021/0119674 | A1* | 4/2021 | Yuan | H04B 7/0456 |
| 2021/0288694 | A1* | 9/2021 | Frenger | H04B 7/026 |
| 2021/0337550 | A1 | 10/2021 | Kumar et al. | |
| 2021/0345131 | A1 | 11/2021 | Pezeshki | |
| 2021/0345316 | A1 | 11/2021 | Xu et al. | |
| 2022/0094491 | A1 | 3/2022 | Choi et al. | |
| 2022/0095240 | A1* | 3/2022 | Ying | H04W 52/367 |
| 2022/0103229 | A1 | 3/2022 | Zhou et al. | |

FOREIGN PATENT DOCUMENTS

| | | | | |
|---|---|---|---|---|
| CN | 105704807 A | * | 6/2016 | ........ H04W 28/0215 |
| CN | 109804575 A | | 5/2019 | |
| CN | 110476396 A | | 11/2019 | |
| EP | 3968729 A1 | * | 3/2022 | ............ H04L 5/001 |
| KR | 20160131092 A | * | 11/2016 | ............ H04W 52/02 |
| WO | WO-2020188829 A1 | * | 9/2020 | ........... H04B 7/0632 |
| WO | WO-2020202397 A1 | * | 10/2020 | ............ H04B 7/088 |
| WO | 2020255404 A1 | | 12/2020 | |
| WO | WO-2021064974 A1 | * | 4/2021 | ........... H04B 7/0632 |

OTHER PUBLICATIONS

International Search Report and Written Opinion—PCT/US2021/030682—ISA/EPO—Jul. 27, 2021.

\* cited by examiner

ESTIMATING FEATURES OF A RADIO FREQUENCY BAND BASED ON AN INTER-BAND REFERENCE SIGNAL

CROSS-REFERENCE TO RELATED APPLICATION

The present application claims the benefit of U.S. Provisional Patent Application No. 63/019,687, filed on May 4, 2020, and titled "ESTIMATING FEATURES OF A 5G NEW RADIO (NR) BAND BASED ON MEASUREMENTS OF AN INTER-BAND SIGNAL," U.S. Provisional Patent Application No. 63/019,887, filed on May 4, 2020, and titled "ESTIMATING FEATURES OF A 5G NEW RADIO (NR) BAND BASED ON AN INTER-BAND SIGNAL TRANSMITTED FROM A DEDICATED TRANSMITTER," U.S. Provisional Patent Application No. 63/019,893, filed on May 4, 2020, and titled "ESTIMATING FEATURES OF A 5G NEW RADIO (NR) BAND BASED ON AN INTER-BAND SIGNAL RECEIVED AT A DEDICATED RECEIVER," and U.S. Provisional Patent Application No. 63/019,900, filed on May 4, 2020, and titled "ESTIMATING FEATURES OF A 5G NEW RADIO (NR) BAND BASED ON AN INTER-BAND SIGNAL RECEIVED AT A DEDICATED," the disclosures of which are expressly incorporated by reference in their entireties.

TECHNICAL FIELD

Aspects of the present disclosure generally relate to wireless communication, and more particularly to techniques and apparatuses for estimating features of a radio frequency band based on a signal transmitted in another band.

DESCRIPTION OF THE RELATED TECHNOLOGY

Wireless communication systems are widely deployed to provide various telecommunications services such as telephony, video, data, messaging, and broadcasts. Typical wireless communication systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (also known as discrete Fourier transform spread OFDM (DFT-s-OFDM)) on the uplink (UL), as well as supporting beamforming, multiple-input multiple-output (MIMO) antenna technology, and carrier aggregation.

Recently, wireless communication systems have incorporated artificial neural networks (for example, neuron models) to estimate one or more features of a network, such as channel conditions or interference. Convolutional neural networks (CNNs) are a type of feed-forward artificial neural network. CNNs may include collections of neurons that each have a receptive field and that collectively tile an input space. CNNs have been used in the area of pattern recognition and classification. Deep learning architectures, such as deep belief networks and deep convolutional networks, are layered neural network architectures in which the output of a first layer of neurons becomes an input to a second layer of neurons, the output of the second layer of neurons becomes an input to a third layer of neurons, and so on. Deep neural networks (DNNs) may be trained to recognize a hierarchy of features, and as such, have increasingly been used in object recognition applications. These deep learning architectures may be distributed over a population of processing nodes, which may be configured in one or more computational chains. These multi-layered architectures may be trained one layer at a time and may be fine-tuned using back propagation.

SUMMARY

The systems, methods, and devices of this disclosure each have several innovative aspects, no single one of which is solely responsible for the desirable attributes disclosed herein.

In one aspect of the present disclosure, a method for wireless communication by a UE includes receiving, from a first TRP operating in a first band, assistance information comprising collocation information for both a second TRP operating in a second band and a communication node operating in the first band. The method further includes receiving, from the first TRP, configuration information for one or more RSs associated with the communication node. The method still further includes communicating with the second TRP based on one or more features of the second band estimated from the one or more RSs.

Another aspect of the present disclosure is directed to an apparatus for wireless communication at a UE including means for receiving, from a first TRP operating in a first band, assistance information comprising collocation information for both a second TRP operating in a second band and a communication node operating in the first band. The apparatus further includes means for receiving, from the first TRP, configuration information for one or more RSs associated with the communication node. The apparatus still further includes means for communicating with the second TRP based on one or more features of the second band estimated from the one or more RSs.

In another aspect of the present disclosure, a non-transitory computer-readable medium with non-transitory program code recorded thereon for wireless communication at a UE is disclosed. The program code is executed by a processor and includes program code to receive, from a first TRP operating in a first band, assistance information comprising collocation information for both a second TRP operating in a second band and a communication node operating in the first band. The program code further includes program code to receive, from the first TRP, configuration information for one or more RSs associated with the communication node. The program code still further includes program code to communicate with the second TRP based on one or more features of the second band estimated from the one or more RSs.

Another aspect of the present disclosure is directed to an apparatus for wireless communication at a UE, the apparatus includes a processor, and a memory communicatively coupled with the processor and storing instructions that, when executed by the processor, cause the apparatus to receive, from a first TRP operating in a first band, assistance information comprising collocation information for both a second TRP operating in a second band and a communication node operating in the first band. Execution of the instructions also cause the apparatus to receive, from the first TRP, configuration information for one or more RSs associated with the communication node. Execution of the instructions further cause the apparatus to communicate with the second TRP based on one or more features of the second band estimated from the one or more RSs.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
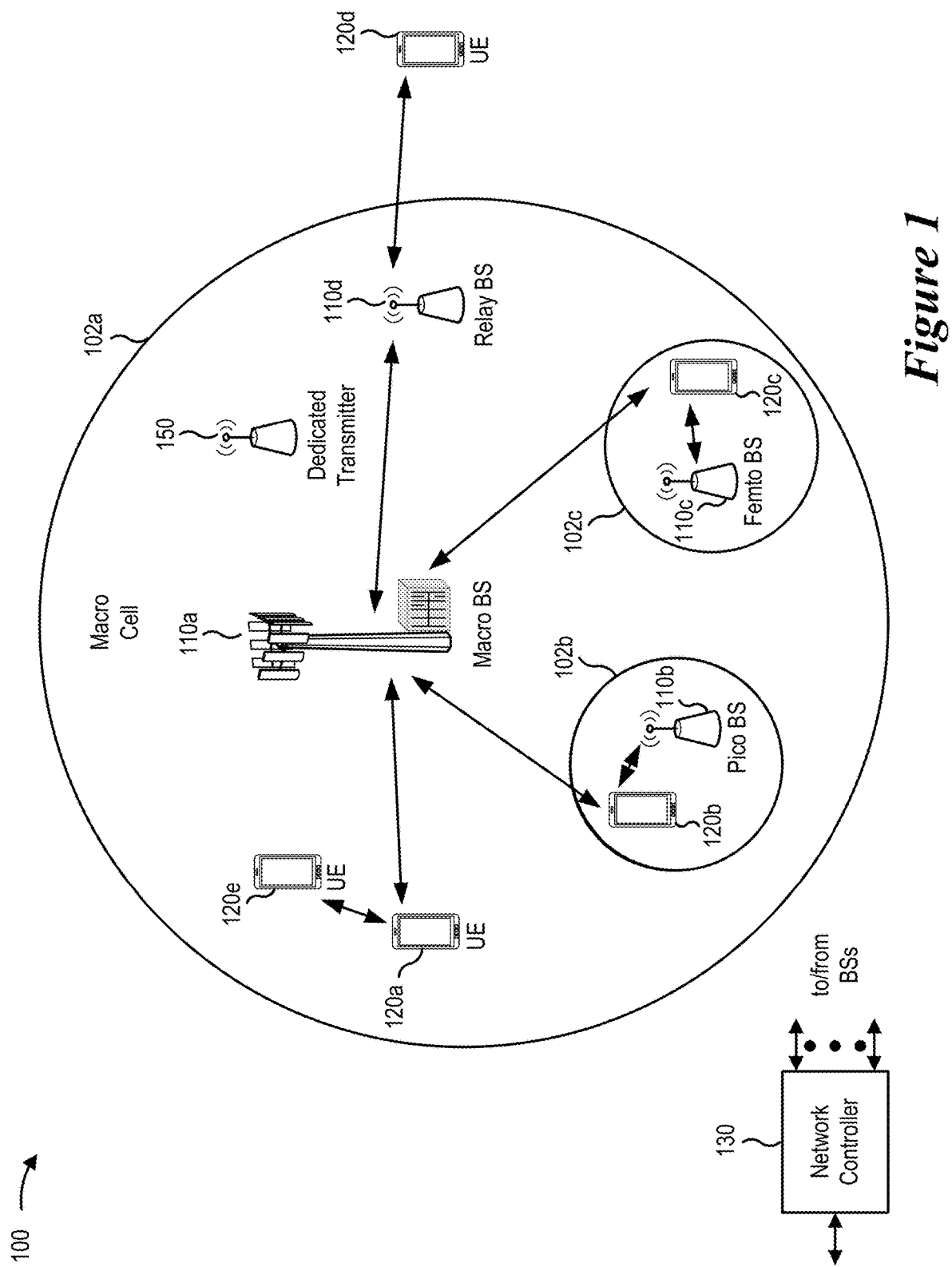
FIG. 1 is a block diagram conceptually illustrating an example of a wireless communication network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G or 4G technologies.

Various aspects relate generally to measuring a signal received in one band and estimating features of another band based on the measurements of the signal. Some aspects more specifically relate to receiving and measuring a signal in a first band at a first wireless communication device, where the signal is transmitted from a second wireless communication device operating in the first band. Some other aspects relate to receiving and measuring a signal in a first band at the second wireless communication device, where the signal is transmitted from the first wireless communication device operating in the first band. The second wireless communication device may be collocated with a third wireless communication device operating in the second band. In some examples, the second band and the first band do not overlap. In some implementations, the first wireless communication device is a UE, the second wireless communication device is a dedicated transmitter or a transceiver, and the third wireless communication device is a transmission and reception point (TRP), such as a base station. In some other implementations, the first wireless communication device is a UE, the second wireless communication device is a dedicated receiver or a transceiver, and the third wireless communication device is a transmission and reception point (TRP), such as a base station.

In some aspects, a trained machine learning model estimates one or more features of the second band based on measurements of a reference signal received in the first band. The reference signal may be received at the UE or the second wireless communication device (for example, the transceiver or the dedicated receiver). The one or more features may include, at least, one or more channel characteristics (for example, a channel quality), a beam direction, or a signal strength. The third wireless communication device may adjust a downlink (DL) transmit power, a DL beam characteristic, or a DL channel for communications with the UE based on the one or more estimated features.

Particular aspects of the subject matter described in this disclosure can be implemented to realize one or more of the following potential advantages. In some examples, the described techniques can reduce a number of signals transmitted to a wireless communication device to reduce network overhead. Reducing the number of signals transmitted to the wireless communication device may also reduce the wireless communication device's power consumption and processor load.

FIG. 1 is a block diagram conceptually illustrating an example of a wireless communication network 100, in accordance with various aspects of the present disclosure. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmission and reception point (TRP), or the like. Each BS may provide communications coverage for a particular geographic area. In 3GPP, the term "cell" can refer to a coverage area of a BS or a BS subsystem serving this coverage area, depending on the context in which the term is used.

A BS may provide communications coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably herein.

In some aspects, a cell may not necessarily be stationary, and the geographic area of the cell may move according to the location of a mobile BS. In some aspects, the BSs may be interconnected to one another or to one or more other BSs or network nodes (not shown) in the wireless network 100 through various types of backhaul interfaces such as a direct physical connection, a virtual network, or the like using any suitable transport network.

The wireless network 100 may also include relay stations. A relay station is an entity that can receive a transmission of data from an upstream station (for example, a BS or a UE) and transmit the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, or the like.

The wireless network 100 may be a heterogeneous network that includes BSs of different types, for example, macro BSs, pico BSs, femto BSs, relay BSs, or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

A network controller 130 may couple to a set of BSs and may provide coordination and control for these BSs. The network controller 130 may communicate with the BSs via a backhaul. The BSs may also communicate with one another, such as, directly or indirectly via a wireless or wireline backhaul.

UEs 120 (for example UEs 120a, 120b, and 120c) may be dispersed throughout the wireless network 100, and each UE may be stationary or mobile. A UE may also be referred to as an access terminal, a terminal, a mobile station, a subscriber unit, a station, or the like. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, or the like, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a customer premises equipment (CPE). UE 120 may be included inside a housing that houses components of UE 120, such as processor components, memory components, or the like.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or the like), a mesh network, or the like. In this case, the UE 120 may perform scheduling operations, resource selection operations, or other operations described elsewhere herein as being performed by the base station 110.

The wireless network 100 may also include a dedicated transmitter 150 operating in a band that is different from the bands of the macro cell 102a, a pico cell 102b, and femto cell 102c. That is, the dedicated transmitter 150 may be an inter-band transmitter and the macro cell 102a, a pico cell 102b, and femto cell 102c may be intra-band base stations 102. However, the dedicated transmitter 150 may be collocated with the macro cell 102a, pico cell 102b, or femto cell 102c. The dedicated transmitter 150 may generally transmit downlink information to one or more UEs 120a, 120b, and 120c. For example, the dedicated transmitter 150 may transmit reference signals, synchronization signals, or positioning signals to the UEs 120a, 120b, and 120c.

Figure 2:
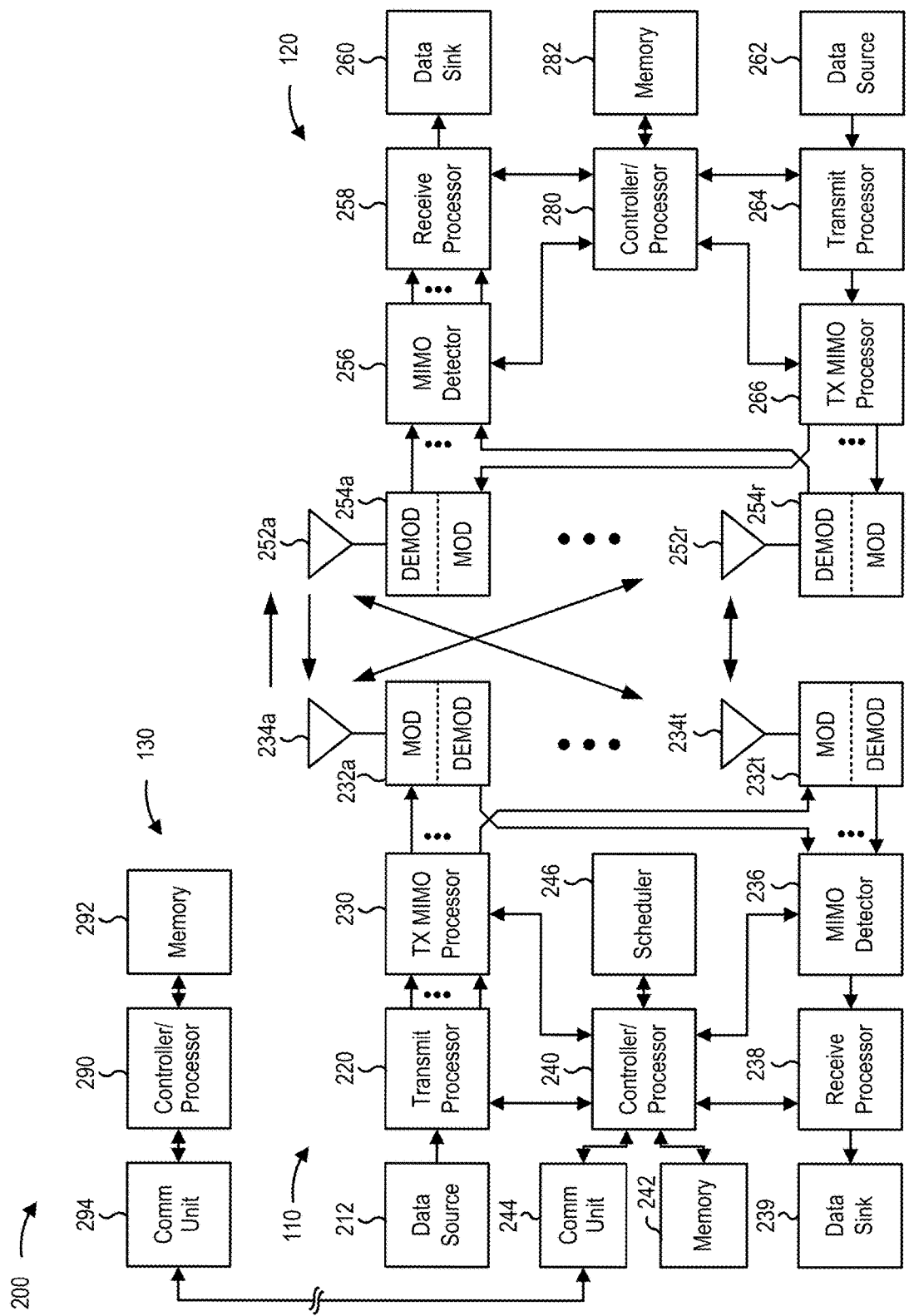
FIG. 2 is a block diagram conceptually illustrating an example of a base station in communication with a user equipment (UE) in a wireless communication network, in accordance with various aspects of the present disclosure.

FIG. 2 is a block diagram conceptually illustrating an example of a base station 110 in communication with a user equipment (UE) 120 in a wireless communication network, in accordance with various aspects of the present disclosure. The base station 110 and UE 120 may be one of the base stations and one of the UEs in FIG. 1. As shown in the design 200, the base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 may also process system information (for example, for semi-static resource partitioning information (SRPI) or the like) and control information (for example, CQI requests, grants, upper layer signaling, or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, or any other component(s) of FIG. 2 may perform one or more techniques associated with machine learning for non-linearities, as described in more detail elsewhere. For example, the controller/processor 240 of the base station 110, the controller/processor 280 of the UE 120, or any other component(s) of FIG. 2 may perform or direct operations of, for example, the processes of FIGS. 9-10 or other processes as described. Memories 242 and 282 may store data and program codes for the base station 110 and UE 120, respectively. A scheduler 246 may schedule UEs for data transmission on the downlink or uplink.

The dedicated transmitter 150 may include some components similar to the components of the base station 110 as described in FIG. 2. However, in some examples, the dedicated transmitter 150 may lack one or more components directed to receiving information. For example, the dedicated transmitter 150 may lack a receive processor 238, a data sink 239, or a multi-in multi-out (MIMO) detector 236. Alternatively, the functions of the receive processor 238, the data sink 239, or the MIMO detector 236 may be implementable by the dedicated transmitter 150 but disabled.

In some cases, different types of devices supporting different types of applications or services may coexist in a cell. Examples of different types of devices include UE handsets, customer premises equipment (CPEs), vehicles, Internet of Things (IoT) devices, or the like. Examples of different types of applications include ultra-reliable low-latency communications (URLLC) applications, massive machine-type communications (mMTC) applications, enhanced mobile broadband (eMBB) applications, vehicle-to-anything (V2X) applications, or the like. Furthermore, in some cases, a single device may support different applications or services simultaneously.

Figure 3:
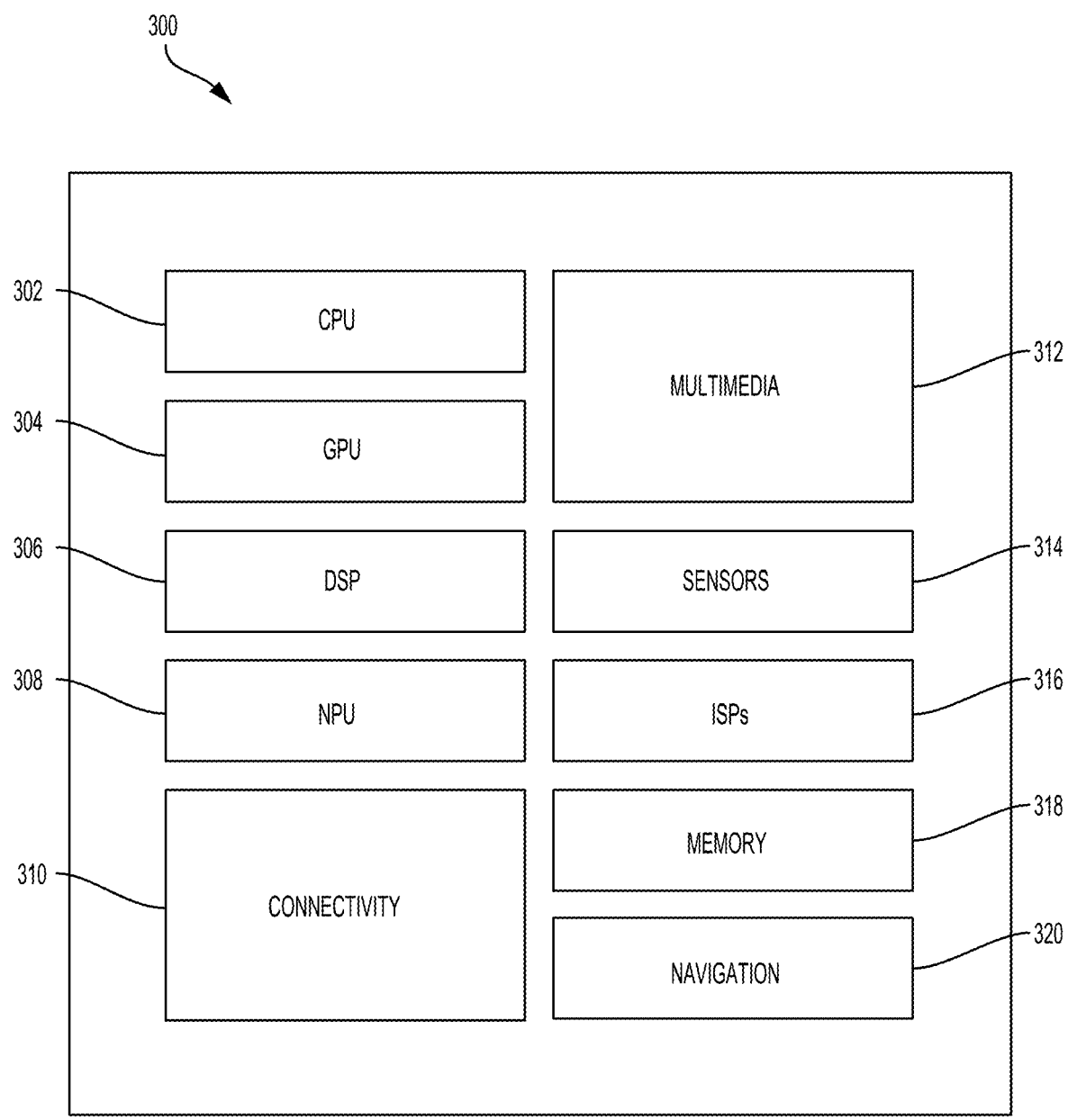
FIG. 3 illustrates an example implementation of a neural network using a system-on-a-chip (SoC), including a central processing unit (CPU), in accordance with some aspects of the present disclosure.

FIG. 3 illustrates an example implementation of a neural network using a system-on-a-chip (SoC) 300, including a central processing unit (CPU) 302, in accordance with some aspects of the present disclosure. The CPU 302, or a multi-core CPU, of the SoC 300 is configured for estimating one or more features of a second band based on measurements of a signal received in a first band, in accordance with some aspects of the present disclosure. The SoC 300 may be included in the base station 110, dedicated transmitter 150, or UE 120. Variables (for example, neural signals and synaptic weights), system parameters associated with a computational device (for example, neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SoC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In some implementations, the NPU is implemented in the CPU, DSP, or GPU. The SoC 300 may also include a sensor processor 314, image signal processors (ISPs) 316, or navigation module 320, which may include a global positioning system.

The SoC 300 may be based on an ARM instruction set. In some aspects of the present disclosure, the instructions loaded into the general-purpose processor 302 may comprise code to receiving, from a first TRP, assistance information indicating a dedicated transmitter collocated with a second TRP. The instructions may also comprise code to receiving a signal from the dedicated transmitter. The instructions may further comprise code to identify the signal from the dedicated transmitter based on the assistance information. The instructions may still further comprise code to perform a measurement based on the received signal. The instructions may also comprise code to estimate one or more features of the second band based on the performed measurements.

In other aspect of the present disclosure, the instructions loaded into the general-purpose processor 302 may comprise code to transmit, to a UE, assistance information indicating a dedicated transmitter collocated with a second TRP. The instructions may also comprise code to receive, from the UE, one or more features of the second band estimated based on a signal transmitted by the dedicated transmitter. The instructions may further comprise code to transmit, to the second TRP, the one or more estimated features.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
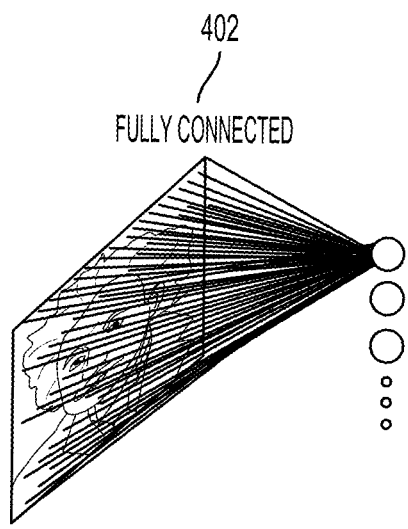
FIG. 4A is a diagram illustrating an example of a neural network, in accordance with some aspects of the present disclosure.
Figure 4B:
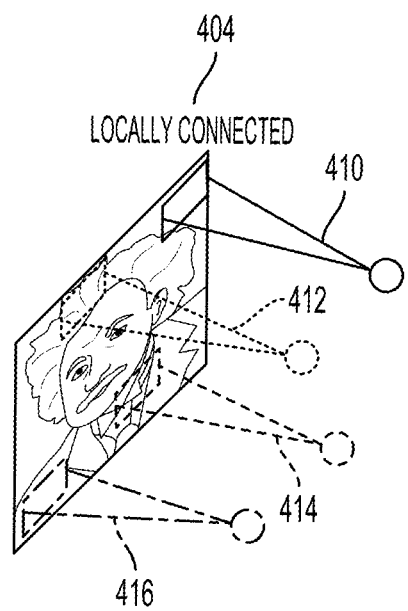
FIG. 4B is a diagram illustrating an example of a neural network, in accordance with some aspects of the present disclosure

The connections between layers of a neural network may be fully connected or locally connected. FIG. 4A is a diagram illustrating an example of a neural network 402, in accordance with some aspects of the present disclosure. The neural network 402 is an example of a fully connected neural network 402. In a fully connected neural network 402, a neuron in a first layer may communicate its output to every neuron in a second layer, so that each neuron in the second layer will receive input from every neuron in the first layer. FIG. 4B is a diagram illustrating an example of a neural network 404, in accordance with some aspects of the present disclosure. The neural network 404 of FIG. 4B is an example of a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (for example, 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
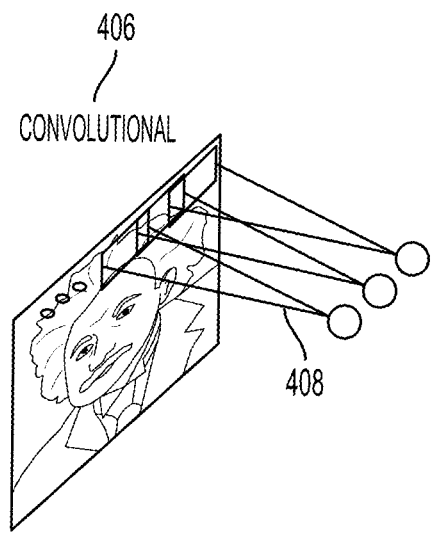
FIG. 4C is a diagram illustrating an example of a neural network, in accordance with some aspects of the present disclosure

One example of a locally connected neural network is a convolutional neural network. FIG. 4C is a diagram illustrating an example of a neural network 406, in accordance with some aspects of the present disclosure. The neural network 406 of FIG. 4C is an example of a convolutional neural network 406. The convolutional neural network 406 may be configured such that the connection strengths associated with the inputs for each neuron in the second layer are shared (for example, 408). Convolutional neural networks may be well suited to problems in which the spatial location of inputs is meaningful.

Figure 4D:
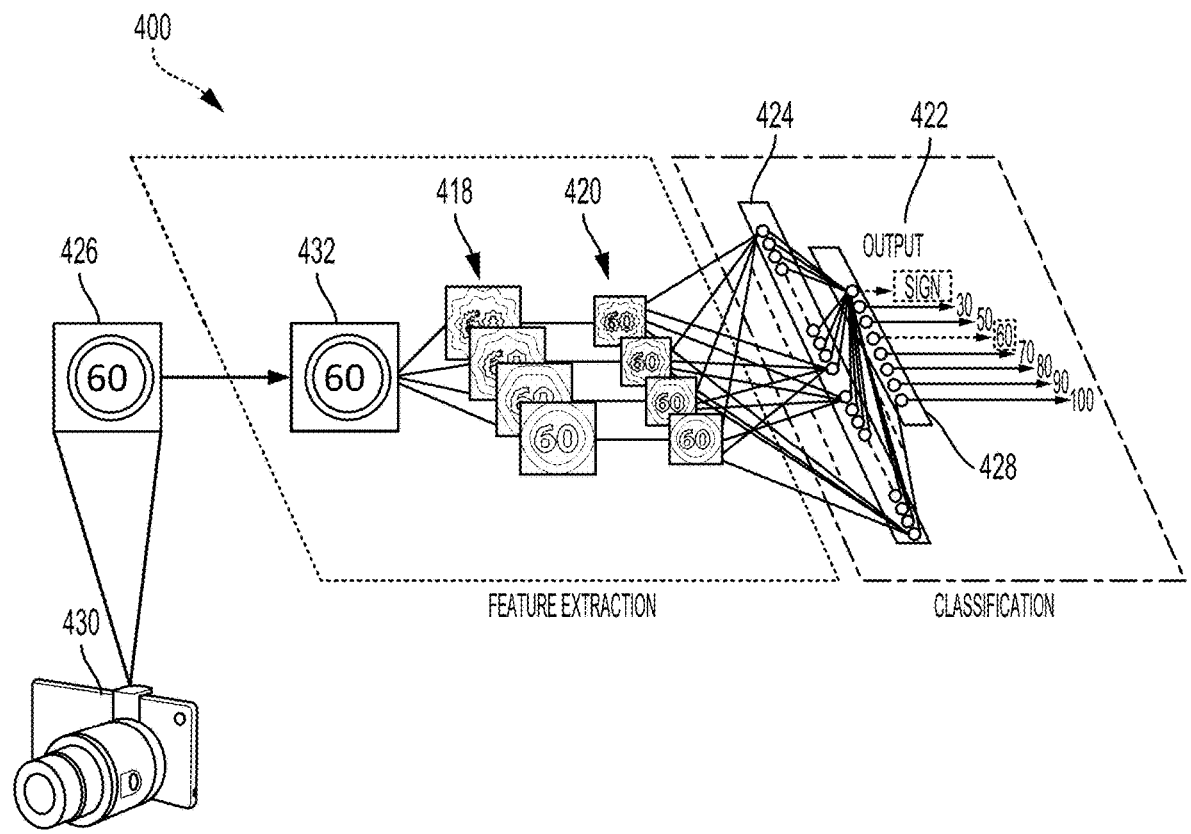
FIG. 4D is a diagram illustrating an example of a deep convolutional network (DCN), in accordance with aspects of the present disclosure.

One type of convolutional neural network is a deep convolutional network (DCN). FIG. 4D is a diagram illustrating an example of a neural network 400 in accordance with some aspects of the present disclosure. The neural network 400 of FIG. 4D is an example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426, such as "sign" and "60." The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (for example, the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (for example, 220) receiving input from a range of neurons in the previous layer (for example, feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
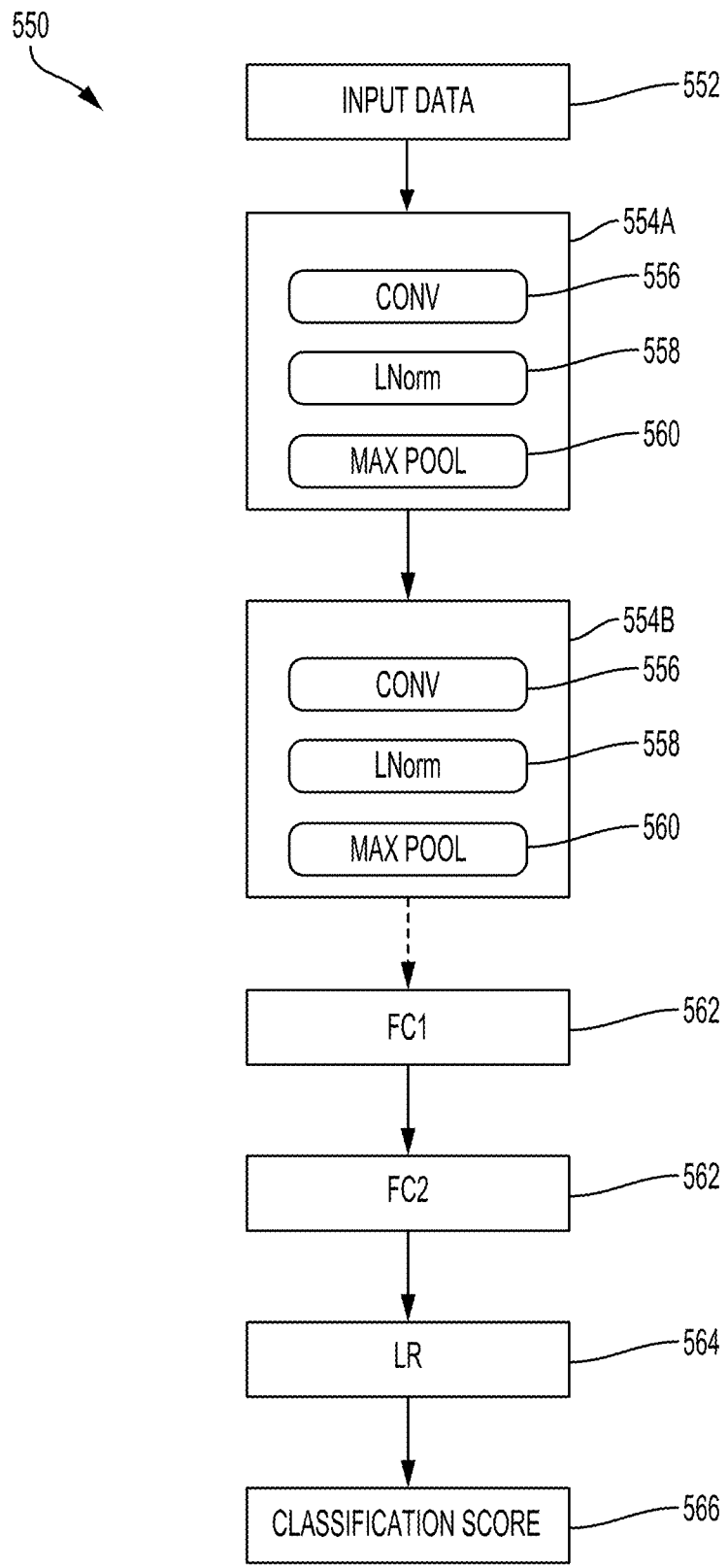
FIG. 5 is a block diagram illustrating an example of a DCN, in accordance with aspects of the present disclosure.

FIG. 5 is a block diagram illustrating an example of a DCN 550, in accordance with aspects of the present disclosure. The DCN 550 may include multiple different types of layers based on connectivity and weight sharing. As shown in FIG. 5, the DCN 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the DCN 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SoC 300 to achieve high performance and low power consumption. In some examples, the parallel filter banks may be loaded on the DSP 306 or an ISP 316 of an SoC 300. In addition, the DCN 550 may access other processing blocks that may be present on the SoC 300, such as sensor processor 314 and navigation module 320, dedicated, respectively, to sensors and navigation.

The DCN 550 may also include one or more fully connected layers 562 (FC1 and FC2). The DCN 550 may further include a logistic regression (LR) layer 564. Between each layer 556, 558, 560, 562, 564 of the DCN 550 are weights (not shown) that are to be updated. The output of each of the layers (for example, 556, 558, 560, 562, and 564) may serve as an input of a succeeding one of the layers (for example, 556, 558, 560, 562, and 564) in the DCN 550 to learn hierarchical feature representations from input data 552 (for example, images, audio, video, sensor data or other input data) supplied at the first of the convolution blocks 554A. The output of the DCN 550 is a classification score 566 for the input data 552. The classification score 566 may be a set of probabilities, where each probability is the probability of the input data, including a feature from a set of features.

In some conventional wireless communication systems, a wireless communication device, such as a UE, a dedicated receiver, or a transceiver, may estimate one or more features of an operating band based on measurements of one or more signals transmitted by a transmission and reception point (TRP) that also operates in a same band as the wireless communication device. The one or more features may include a beam direction, signal strength, or various channel characteristics. In some systems, the wireless communication device may be configured for communications with two different TRPs operating in two different bands. In such systems, the wireless communication device may receive signals from each of the two TRPs to estimate one or more features of the respective bands.

In some systems, features for a given band may be estimated based on measurements of a signal transmitted in the band. Still, in such systems, an amount of signaling increases when estimating features in multiple bands. It may be desirable to reduce the signaling, including the number of signals transmitted to a wireless communication device to reduce network overhead. Reducing the number of signals transmitted to the wireless communication device may also reduce the wireless communication device power consumption and processor load. That is, performing measurements in one band to estimate one or more features of another band may reduce beam management overhead or reduce a wireless communication device's power consumption.

Various aspects relate generally to measuring a signal received in one band and estimating features of another band based on the measurements of the signal. Some aspects more specifically relate to receiving and measuring a signal in a first band at a first wireless communication device, where the signal is transmitted from a second wireless communication device operating in the first band. Some other aspects relate to receiving and measuring a signal in a first band at the second wireless communication device, where the signal is transmitted from the first wireless communication device operating in the first band. The second wireless communication device may be collocated with a third wireless communication device operating in the second band. In some examples, the second band and the first band do not overlap. In some implementations, the first wireless communication device is a UE, the second wireless communication device is a dedicated transmitter or a transceiver, and the third wireless communication device is a TRP, such as a base station. In some other implementations, the first wireless communication device is a UE, the second wireless communication device is a dedicated receiver or a transceiver, and the third wireless communication device is a TRP, such as a base station.

In some aspects, a trained machine learning model estimates one or more features of the second band based on measurements of a reference signal received in the first band. The reference signal may be received at the UE or the second wireless communication device (for example, the transceiver or the dedicated receiver). The one or more features may include, at least, one or more channel characteristics (for example, a channel quality), a beam direction, or a signal strength. The third wireless communication device may adjust a downlink (DL) transmit power, a DL beam characteristic, or a DL channel for communications with the UE based on the one or more estimated features.

According to aspects of the present disclosure, a UE may be configured for communications with two non-collocated TRPs, such as two non-collocated base stations, where each TRP operates in a different band. In some examples, the first band may be within a first frequency range, such as frequency range one (FR1-sub 6 GHz), and the second band may be within a second frequency range, such as frequency range two (FR2-millimeter wave (mmWave)). In some other examples, the first band may be within FR2 and the second band may be in a higher non-overlapping frequency range, such as frequency range four (FR4). The first band and second band are not limited to the frequency ranges described above, as other ranges are possible in other examples. In some implementations, a first TRP of the non-collocated TRPs operates according to a first radio access technology (RAT) and a second TRP of the non-collocated TRPs operates according to a second RAT. In some examples, the first RAT is an LTE RAT or an NR sub-6 GHz RAT. In such examples, the second RAT is an mmWave RAT or another RAT operating on a band different from a band of the first RAT.

In various aspects, a dedicated transmitter collocated with the second TRP may operate in the first band. The dedicated transmitter may be located at a same location as the second TRP or close to the second TRP's location, for example, less than a threshold distance apart. For example, if the threshold distance is ten meters, the dedicated transmitter may be at a location that is less than ten meters from the second TRP's location. In some examples in which the dedicated transmitter is at the same location as the second TRP, the dedicated transmitter may be defined on the same infrastructure, such as a cell tower, as the second TRP. In some aspects, the dedicated transmitter may be a reduced-functionality dedicated transmitter. For example, the dedicated transmitter may not include capabilities for receiving UL communications and may not include capabilities for transmitting some DL communications including some reference signals or synchronization signals that would typically be transmitted by a base station.

The dedicated transmitter may periodically transmit one or more reference signals in the first band to the UE. The one or more reference signals may be transmitted periodically, aperiodically, on-demand, persistently, or semi-persistently. In some aspects, the UE performs measurements on the reference signal and estimates features of the second band based on the measurements of the reference signal received in the first band. Additionally or alternatively, the UE may transmit a report indicating the measurements, or including information based on the measurements, to one or both of the first TRP and the second TRP. In such examples, the first TRP or the second TRP may estimate the features of the second band based on the measurements or information.

Figure 6:
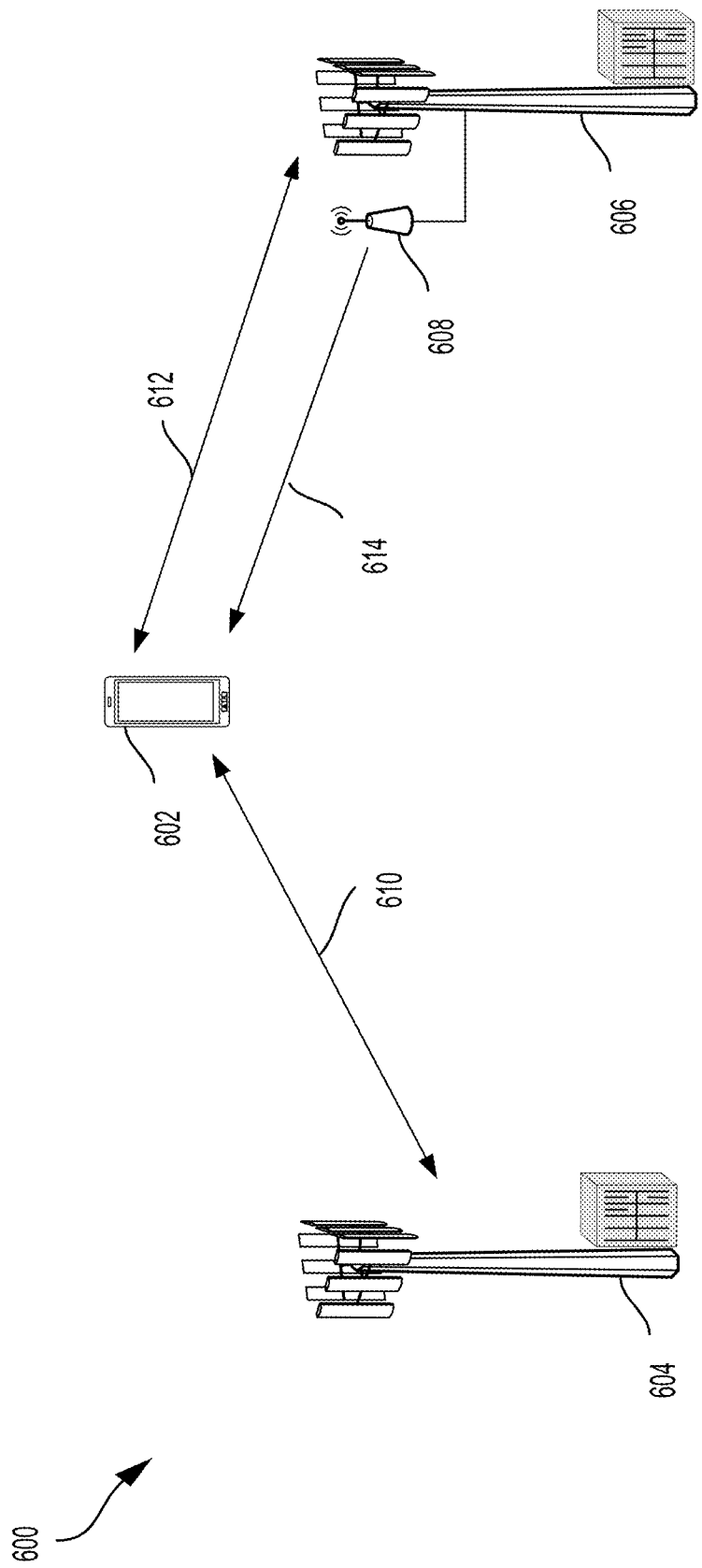
FIGS. 6, 7, 8, 9A, and 9B are block diagrams illustrating examples of a wireless communication system that supports estimating features of one band based on measurements of another band, in accordance with aspects of the present disclosure.

FIG. 6 is a block diagram illustrating an example of a wireless communication system 600 that supports estimating features of one band based on measurements of another band, in accordance with aspects of the present disclosure. In the example of FIG. 6, the wireless communication system 600 includes a UE 602, a first base station 604 operating in a first band, a second base station 606 operating in a second band, and a dedicated transmitter 608 operating in the first band. The UE 602 is configured for operating in both the first and the second bands. The first base station 604 and second base station 606 are examples of TRPs. In some examples, the first band is within FR1 and the second band is within FR2. Performing measurements in FR1 to estimate one or more features of FR2 may reduce beam management overhead or reduce the UE 602 power consumption.

In the example of FIG. 6, the dedicated transmitter 608 is collocated with, and specifically at a same location as, the second base station 606. In such examples, the dedicated transmitter 608 is integrated with an infrastructure of the second base station 606, such as sharing a cellular tower. In other examples, as described above, a distance between a location of the dedicated transmitter 608 and a location of the collocated second base station 606 may be less than a distance threshold apart. As described above, the dedicated transmitter 608 may be a reduced-functionality dedicated transmitter.

The UE 602 and the first base station 604 may exchange uplink (UL) and downlink (DL) communications 610 via a first band, and the UE 602 and the second base station 606 may exchange UL and DL communications 612 via a second band that may not overlap the first band. The DL communications 610 and 612 may include, for example, reference signals, synchronization signals, control information, and/or data information, such as in the form of packets, carried via various channels including control channels (for example, a physical downlink control channel (PDCCH)) and data channels (for example, a physical downlink shared channel (PDSCH)). In some examples, the dedicated transmitter 608 may not transmit data via data channels. The UL communications 610 and 612 may include, for example, reference signals, control information, and data, such as in the form of packets, carried via various channels including control channels (for example, a physical uplink control channel (PUCCH)) and data channels (for example, a physical uplink shared channel (PUSCH)).

In various examples, the UE 602 may receive DL-only communications or signals 614 from the dedicated transmitter 608 via the first band. For example, the dedicated transmitter 608 may only transmit a reference signal, such as a channel state information reference signal (CSI-RS), a synchronization signal block (SSB), or a pathloss (PL) RS. As described above, the dedicated transmitter 608 may not include capabilities for receiving UL communications and may not include capabilities for transmitting some DL communications, including some reference signals or synchronization signals that would typically be transmitted by a base station. For example, the dedicated transmitter 608 may not be capable of transmitting, or may be disabled from transmitting, data, such as data transmitted via a PDSCH, or reference signals for demodulating data symbols. In some implementations, the dedicated transmitter 608 is a transmit-only node of a terrestrial beacon system. In such implementations, the dedicated transmitter 608 may transmit a DL positioning reference signal (PRS) to the UE 602 for positioning. In some other examples, the dedicated transmitter 608 may not be limited to being a transmit-only node of a terrestrial beacon system. For example, the dedicated transmitter 608 may be another type of transmitter that is not configured for receiving information from the UE 602. Although it may not receive communications or signals from the UE 602, the dedicated transmitter 608 may communicate with one or both of base stations 604 and 606 via a backhaul connection (not shown in FIG. 6).

As described above, the dedicated transmitter 608 may additionally or alternatively transmit an SSB to the UE 602. In some examples, the SSB may be an off-synchronization raster SSB that is not included within a synchronization raster. In such examples, the off-synchronization raster SSB is not included within a frequency position of a synchronization block used for system acquisition. In other examples, the SSB may be a non-cell defining SSB, in which a cell ID is not associated with the SSB. In various examples, the SSB may be used to obtain power delay profile (PDP) estimates of the first band, or other information of the first band, such as a received signal power. In some examples, bits within a master information block (MIB) may indicate to the UE 602 that the SSB is to be used for measurements of the first band, such as PDP estimates, in addition to, or as an alternate to, synchronization or cell definition.

In some examples, in addition to, or as an alternate to, estimating the PDP based on the SSB, the UE 602 may estimate the PDP based on a CSI-RS transmitted by the dedicated transmitter 608. In either or both cases, the UE 602 may estimate a received signal power based on the PDP. According to aspects of the present disclosure, the UE 602 receives assistance information from the first base station 604 to identify reference signals transmitted by the dedicated transmitter 608. The assistance information may be received in one or more system information blocks (SIBs). In some examples, the assistance information may include a CSI-RS configuration for identifying CSI-RS resources, such as resource blocks, used by the dedicated transmitter 608 for transmitting the CSI-RS. In some such examples, the CSI configuration may provide other CSI-RS information, in addition to the CSI-RS resources. In some implementations, the CSI configuration may indicate whether the CSI-RS is, for example, periodic, aperiodic, semi-persistent, or dynamic. Additionally, in some aspects, the UE 602 receives configuration information for one or more reference signals associated with the dedicated transmitter 608 from the first base station 604. The configuration information may configure the UE 602 to receive one or more reference signals from the dedicated transmitter 608. Additionally, or alternatively, the dedicated transmitter 608 receives configuration information for one or more reference signals from the first base station 604. The configuration information may configure the dedicated transmitter 608 to transmit the one or more reference signals to the UE 602.

As described below, a machine learning model, such as a machine learning model implemented via an SoC 300 as described in FIG. 3, may be trained for use in estimating one or more features of the second band based on measurements of the reference signal received in the first band. The features may include one, some, or all of one or more channel characteristics, a received signal power, or a beam direction, among other examples. The SoC implementing the machine learning model may be a component of one or more of the UE 602, the first base station 604 or the second base station 606. In other words, whichever one or more of the UE 602, the first base station 604, or the second base station 606 is configured to perform the estimation of the features may include hardware or software for implementing the machine learning model. The machine learning model implemented by the SoC may be a type of neural network. For example, the machine learning model may be a convolutional neural network, a deep convolutional neural network, or another type of neural network.

In some examples in which the machine learning model is implemented in the UE 602, the UE 602 estimates one or more features of the second band based on measurements it performs on the reference signal transmitted from the dedicated transmitter 608 in the first band. In response to estimating the one or more features, the UE 602 may transmit a report including indications of the one or more estimated features to the second base station 606. The second base station 606 may select or otherwise manage parameters for a DL beam or a channel for transmissions to the UE 602 based on one or more of the estimated features. For example, the second base station 606 may adjust a DL beam direction based on the estimated features.

In some examples in which the model is implemented in the second base station 606, the UE 602 may transmit a report including measurements of the reference signal received in the first band to the second base station 606. In some such examples, the report may include the measurements performed by the UE 602 of the CSI-RS, SSB, or PRS received in the first band at the UE 602. In some implementations, the UE 602 may estimate a PDP of the first band and transmit an indication of the PDP estimate to the second base station 606 with the measurements. The second base station 606 may estimate one or more features of the second band based on the reference signal measurements included in the report. The second base station 606 may select or otherwise manage parameters for a beam or a channel based on one or more of the estimated features. For example, the second base station 606 may adjust a beam direction based on the estimated features.

In some examples, the model is implemented in the first base station 604. In such examples, the UE 602 may transmit a report including measurements of the reference signal received in the first band to the second base station 606. In some such examples, the report may include the measurements performed by the UE 602 of the CSI-RS, SSB, or PRS received in the first band at the UE 602. In some implementations, the UE 602 may estimate a PDP of the first band and transmit an indication of the PDP estimate to the first base station 604 with the measurements. The first base station 604 may estimate one or more features of the second band based on the reference signal measurements included in the report. The first base station 604 may forward the one or more estimated features to the second base station 606, and the second base station 606 may manage parameters of a DL beam for transmissions to the UE 602 or a DL channel for transmissions to the UE 602 based on the one or more estimated features.

In various examples, the machine learning model may be trained, prior to deployment, during a training phase. In the training phase, the machine learning model learns to estimate features of the second band based on measurements of a signal received in the first band. In some examples, during the training phase, the machine learning model receives measurements performed on a training signal. The training signal may be transmitted in a first band from the dedicated transmitter 608 or another wireless communication device (for example, a dedicated training transmitter not shown in FIG. 6) to the UE 602. The machine learning model may be used to estimate one or more features in the second band based on the measurements performed on the training signal. The estimated features may be compared with ground truth labels. In some examples, actual features, such as actual signal strength, beam direction, or channel characteristics of the second band are indicated by the ground truth labels. In some aspects, the machine learning module is trained to reduce a loss between the estimated features and the ground truth labels. In some examples, the UE 602 may share the trained machine learning model with one or both of the first base station 604 and the second base station 606.

According to some aspects of the present disclosure, a dedicated receiver operating in a first band may be collocated with a second TRP operating in a second band. The dedicated receiver may be located at a same location as the second TRP or close to the second TRP's location, for example, less than a threshold distance apart. For example, if the threshold distance is ten meters, the dedicated receiver may be at a location that is less than ten meters from the second TRP's location. In some examples in which the dedicated receiver is at the same location as the second TRP, the dedicated receiver may be defined on the same infrastructure, such as a cell tower, as the second TRP. In some implementations, the dedicated receiver may be a reduced functionality dedicated receiver. For example, the dedicated receiver may not include capabilities for transmitting DL communications and may not include capabilities for transmitting some DL communications including some reference signals or synchronization signals that would typically be transmitted by a base station.

The dedicated receiver may receive one or more reference signals in the first band from the UE. As an example, the configuration may be provided to the dedicated receiver on a backhaul connection. In one configuration, the one or more reference signals may be transmitted to the dedicated receiver in response to a triggering event. In some aspects, the dedicated receiver performs measurements on the one or more reference signals and estimates features of the second band based on the measurements of the one or more reference signals received in the first band. Additionally or alternatively, the dedicated receiver may transmit a report indicating the measurements, or including information based on the measurements, to one or both of the first TRP and the second TRP. In such examples, the first TRP or the second TRP may estimate the features of the second band based on the measurements or information. In some implementations, the UE receives configuration information for transmitting one or more reference signals to the dedicated receiver. The configuration information may be transmitted by the first TRP.

Figure 7:
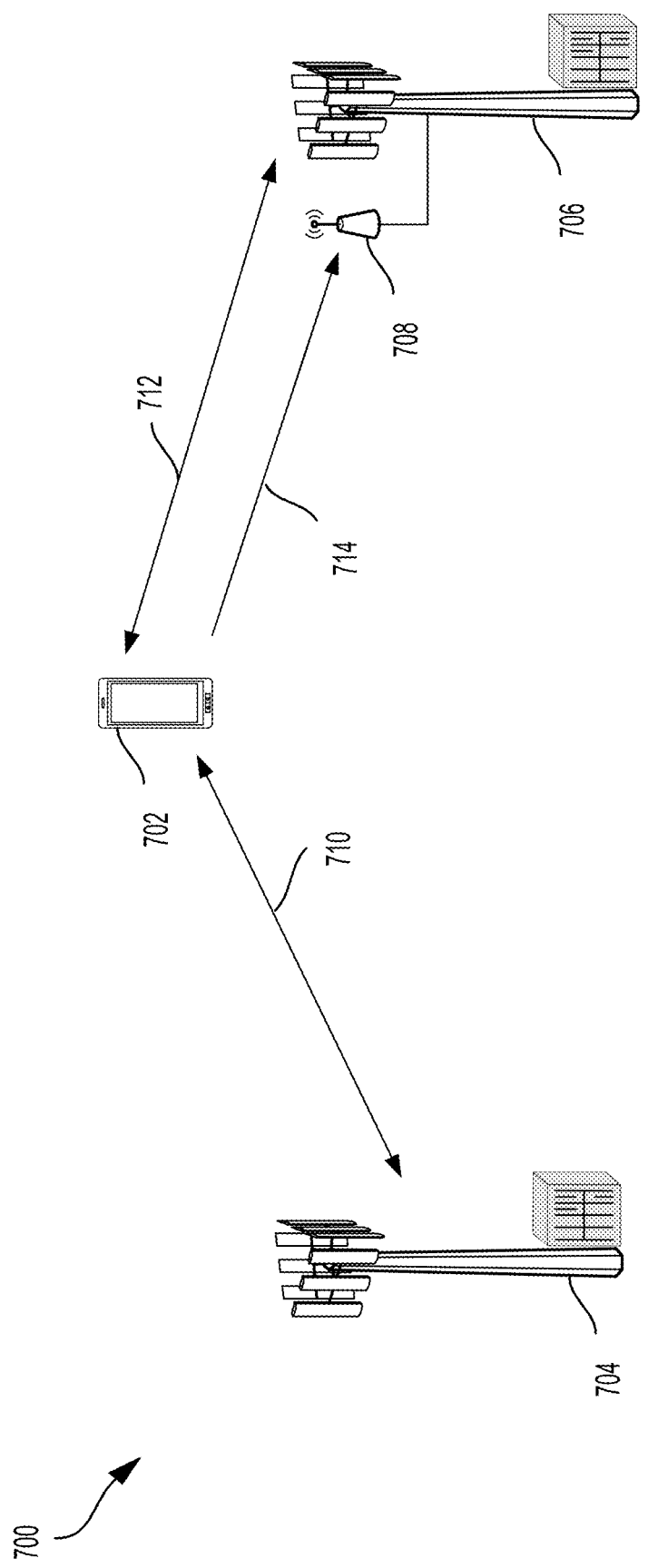

FIG. 7 is a block diagram illustrating an example of a wireless communication system 700 that supports estimating features of one band based on measurements of another band, in accordance with aspects of the present disclosure. In the example of FIG. 7, the wireless communication system 700 includes a UE 702, a first base station 704 operating in a first band, a second base station 706 operating in a second band, and a dedicated receiver 708 operating in the first band. The UE 702 is configured for operating in both the first and the second bands. The first base station 704 and second base station 706 are examples of TRPs. In some examples, the first band is within FR1 and the second band is within FR2. Performing measurements in FR1 to estimate one or more features of FR2 may reduce beam management overhead or reduce the UE 702 power consumption.

In the example of FIG. 7, the dedicated receiver 708 is collocated with, and specifically at a same location as, the second base station 706. In such examples, the dedicated receiver 708 is integrated with an infrastructure of the second base station 706, such as sharing a cellular tower. In other examples, as described above, a distance between a location of the dedicated receiver 708 and a location of the collocated second base station 706 may be less than a distance threshold apart. As described above, the dedicated receiver 708 may be a reduced-functionality dedicated receiver.

The UE 702 and the first base station 704 may exchange uplink (UL) and downlink (DL) communications 710 via a first band, and the UE 702 and the second base station 706 may exchange UL and DL communications 712 via a second band that may not overlap the first band. The DL communications 710 and 712 may include, for example, one or more reference signals, synchronization signals, control information, and/or data information, such as in the form of packets, carried via various channels including control channels (for example, a physical downlink control channel (PDCCH)) and data channels (for example, a physical downlink shared channel (PDSCH)). In some examples, the dedicated receiver 708 may not transmit data via data channels. The UL communications 710 and 712 may include, for example, reference signals, control information, and data, such as in the form of packets, carried via various channels including control channels (for example, a physical uplink control channel (PUCCH)) and data channels (for example, a physical uplink shared channel (PUSCH)).

In various examples, the UE 702 may transmit UL-only communications or signals 714 to the dedicated receiver 708 via the first band. As described above, the dedicated receiver 708 may not include capabilities for transmitting DL communications and may not include capabilities for receiving some UL communications including some reference signals that would typically be transmitted to a base station. For example, the dedicated receiver 708 may not be capable of receiving, or may be disabled from receiving, data, such as data transmitted via a PUSCH, or reference signals for demodulating data symbols. Rather, the dedicated receiver 708 may receive stand-alone reference signals, such as sounding reference signals (SRSs) transmitted by the UE 702. In some such examples, the dedicated receiver 708 may estimate UL channel characteristics or UL timing based on the SRSs. A channel quality is an example of a channel characteristic. In some implementations, the dedicated receiver 708 is a receiver-only node of a terrestrial beacon system. In such examples, the dedicated receiver 708 may receive SRSs from the UE 702 in response to a DL positioning reference signal (PRS) transmitted to the UE 702 by a transmitter-node of the terrestrial beacon system (not shown in FIG. 7). While the UE 702 may transmit an SRS to the dedicated receiver 708, in some examples, the UE 702 does not receiver a DL PRS an SRS or any other information from the dedicated receiver 708. In some other examples, the dedicated receiver 708 may not be limited to being a receive-only node of a terrestrial beacon system. For example, the dedicated receiver 708 may be another type of receiver that is not configured for transmitting information to the UE 702. Although it may not transmit communications or signals to UEs, the dedicated receiver 708 may communicate with one or both of base stations 704 and 706 via a backhaul connection (not shown in FIG. 7).

In some implementations, the first or second base stations 704 and 706 may determine power control information for adjusting the transmit power of the UE 702 based on the power headroom (PHR) and the location of the UE 702. The first or second base stations 704 and 706 may transmit DL pathloss (PL) reference signals (RSs) to the UE 702. A change in PL between multiple DL PL RSs transmitted by one of the base stations 704 and 706 may trigger the UE 702 to transmit a PHR report to the base station 704 or 706. In such examples, in which the UE 702 transmits the PHR report in response to the change in PL, the PHR report is an example of a PL-based PHR report.

As indicated above, in some examples, the dedicated receiver 708 is not capable of transmitting DL PL RSs for triggering a PL-based PHR report. In such examples, the first base station 704 may configure the UE 702 for periodic PHR reporting. Based on such a periodic PHR reporting configuration, the UE 702 may periodically transmit the PHR report for UL transmissions to the dedicated receiver 708 to the first base station 704. Additionally, or alternatively, the UE 702 may include the PHR report intended for UL transmissions to the dedicated receiver 708 in a PL-based PR report triggered by DL PL RSs transmitted by the first base station 704. The first base station 704 may use the UE 702 location and the PHR report intended for UL transmissions to the dedicated receiver 708 to adjust a transmit power of transmissions from the UE 702 to the dedicated receiver 708. For example, the transmit power for transmissions from the UE 702 to the dedicated receiver 708 may be advantageously adjusted to a value to overcome interference from the second base station 706 while preventing saturation at the dedicated receiver 708.

As also indicated above, the dedicated receiver 708 may not be capable of transmitting a DL reference signal for SRS beam spatial relations. In some examples in which the first band is within a first frequency range (for example, FR1) and the second band is within a second frequency range (for example, FR2), SRS transmissions from the UE 702 in the first band and second band may not be beamformed. That is, the SRS transmissions may be isotropic. In other examples in which the first band operates within a second frequency range (for example, FR2) and the second band operates within a frequency range that is higher than the second frequency range, such as frequency range four (FR4), the SRS transmissions from the UE 702 may be beamformed in both bands. Additionally, in such examples in which the first band operates within FR2 and the second band operates within a frequency range that is greater than FR2, cross-frequency quasi-collocation (QCL) information may be transmitted to the UE 702 for identifying SRS beams in the first band that are quasi-collocated with SRS beams in the second band. That is, both UL transmissions are beamformed. The UE 702 may use the QCL information of the second band to beamform SRSs towards the dedicated receiver 708.

As described, the dedicated receiver 708 may not be capable of transmitting DL PL RSs for triggering a PL-based PHR report. In some examples, the UE 702 may be configured to form and sweep its own UL beams to identify SRS beams. In such examples, the UE 702 may transmit SRSs to the dedicated receiver 708 and the second base station 706 via the identified SRS beams.

As similarly described above, the dedicated receiver 708 may also not be capable of transmitting DL RSs for synchronization, such as timing tracking. In some such examples, the UE 702 determines a timing for UL transmissions to the dedicated receiver 708 from one or more other transmissions of another wireless communication device. For example, the timing for the UL transmissions from the UE 702 to the dedicated receiver 708 may be determined from one or more DL RSs of one or more component carriers (CCs) in a timing advance group (TAG). Additionally, the dedicated receiver 708 may not be capable of transmitting DL RSs for frequency tracking. In some implementations, the UE 702 determines a frequency of UL transmissions to the dedicated receiver 708 is determined from a reference frequency of a supplementary uplink (SUL).

As described above, the dedicated receiver 708 operating in the first band may be collocated with the second base station 706 operating in the second band. In such examples, the first base station 704 may transmit a message requesting the UE 702 to transmit a reference signal, such as an SRS, to the dedicated receiver 708 in response to receiving a triggering signal from the first base station 704. The triggering signal may be a reference signal or a DL control signal, such as a radio resource control (RRC), medium access control-control element (MAC-CE), or DL control information (DCI). In some aspects, the message may also include power control information for adjusting a transmit power of the reference signal transmission from the UE 702 to the dedicated receiver 708. As described above, the first base station 704 may determine the power control information from a PHR report received from the UE 702 as well as the location of the UE 702 in relation to a location of the dedicated receiver 708. In some implementations, the UE 702 receives configuration information for transmitting the reference signal, such as the SRS, to the dedicated receiver 708. The configuration information may be transmitted from the first base station 704. Additionally, or alternatively, the dedicated receiver 708 may receive configuration information from the first base station 704 for receiving the reference signal, such as the SRS, from the UE 702.

As described below, a machine learning model, such as a machine learning model implemented via an SoC 300 as described in FIG. 3, may be trained for use in estimating one or more features of the second band based on measurements of the reference signal received in the first band. The features may include one, some, or all of one or more channel characteristics, a received signal power, or a beam direction, among other examples. Notably, according to aspects of the present disclosure, the features may be advantageously estimated specifying the dedicated receiver 708 to measure any signals received in the second band. The SoC implementing the machine learning model may be a component of one or more of the UE 702, the first base station 704, or the second base station 706. In other words, whichever one or more of the UE 702, the first base station 704, or the second base station 706 is configured to perform the estimation of the features may include hardware or software for implementing the machine learning model. The machine learning model implemented by the SoC may be a type of neural network. For example, the machine learning model may be a convolutional neural network, a deep convolutional neural network, or another type of neural network.

In some examples, the machine learning model is implemented in the dedicated receiver 708. In such examples, the dedicated receiver 708 estimates one or more features of the second band based on measurements it performs on the reference signal transmitted from the UE 702. In response to estimating the one or more features, the dedicated receiver 708 may transmit a report including indications of the one or more estimated features to the second base station 706 via a backhaul link (not shown in FIG. 7). The second base station 706 may select or otherwise manage parameters for a DL beam or a channel for transmissions to the UE 702 based on one or more of the estimated features. For example, the second base station 706 may adjust a DL beam direction based on the estimated features.

In some examples, the machine learning model is implemented in the second base station 706. In such examples, the dedicated receiver 708 may transmit a report including measurements of the reference signal received in the first band to the second base station 706 via a backhaul link (not shown in FIG. 7). For example, the dedicated receiver 708 may forward the measurements of the SRS received from the UE 702 in the first band to the second base station 706. The second base station 706 may estimate one or more features of the second band based on the forwarded reference signal measurements. The second base station 706 may select or otherwise manage parameters for a beam or a channel based on one or more of the estimated features. For example, the second base station 706 may adjust a beam direction based on the estimated features.

In various examples, the machine learning model may be trained, prior to deployment, during a training phase. In the training phase, the machine learning model learns to estimate features of the second band based on measurements of a signal received in the first band. In some examples, during the training phase, the machine learning model receives measurements performed on a training signal. The training signal may be transmitted in a first band from the UE 702 or another wireless communication device (for example, a dedicated training UE not shown in FIG. 7) to the dedicated receiver 708. The machine learning model may be used to estimate one or more features in the second band based on the measurements performed on the training signal. The estimated features may be compared with ground truth labels. In some examples, actual features, such as actual signal strength, beam direction, or channel characteristics of the second band are indicated by the ground truth labels. In some aspects, the machine learning module is trained to reduce a loss between the estimated features and the ground truth labels. In some examples, the dedicated receiver 708 may share the trained machine learning model with one or both of the first base station 704 and the second base station 706.

In various aspects, a reduced-functionality transceiver collocated with the second TRP may operate in the first band. The reduced-functionality transceiver may be located at a same location as the second TRP or close to the second TRP's location, for example, less than a threshold distance apart. For example, if the threshold distance is ten meters, the reduced-functionality transceiver may be at a location that is less than ten meters from the second TRP's location. In some examples in which the reduced-functionality transceiver is at the same location as the second TRP, the reduced-functionality transceiver may be defined on the same infrastructure, such as a cell tower, as the second TRP. For example, the reduced-functionality transceiver may not include capabilities for transmitting some DL communications including some reference signals or synchronization signals that would typically be transmitted by a base station. As another example, the reduced-functionality transceiver may not include capability for receiving some UL communications.

The reduced-functionally transceiver may receive one or more on-demand RSs in the first band from the UE in response to an on-demand RS request transmitted by the reduced-functionally transceiver. In some aspects, the reduced-functionally transceiver performs measurements on the on-demand RS and estimates features of the second band based on the measurements of the on-demand RS received in the first band. In some such aspects, the transceiver receives configuration information for transmitting and/or receiving one or more RSs in the first band. In such aspects, the configuration information may be transmitted from the first TRP to the transceiver. In some implementations, the reduced-functionally transceiver may transmit a report indicating the measurements, or including information based on the measurements, to one or both of the first TRP and the second TRP. In such examples, the first TRP or the second TRP may estimate the features of the second band based on the measurements or information.

In some aspects, the UE may receive one or more on-demand RSs in the first band from the reduced-functionally transceiver in response to an on-demand RS request transmitted by the UE. In such aspects, the UE performs measurements on the on-demand RS and estimates features of the second band based on the measurements of the on-demand RS received in the first band. In some such aspects, the UE receives configuration information for transmitting and/or receiving one or more RSs in the first band. For example, the UE may transmit the one or more RSs to the transceiver based on the configuration information. In such aspects, the configuration information may be transmitted from the first TRP to the UE. In some implementations, the UE may transmit a report indicating the measurements, or including information based on the measurements, to one or more of the first TRP, the second TRP, or the reduced-functionally transceiver. In such examples, the first TRP or the second TRP may estimate the features of the second band based on the measurements or information.

Figure 8:
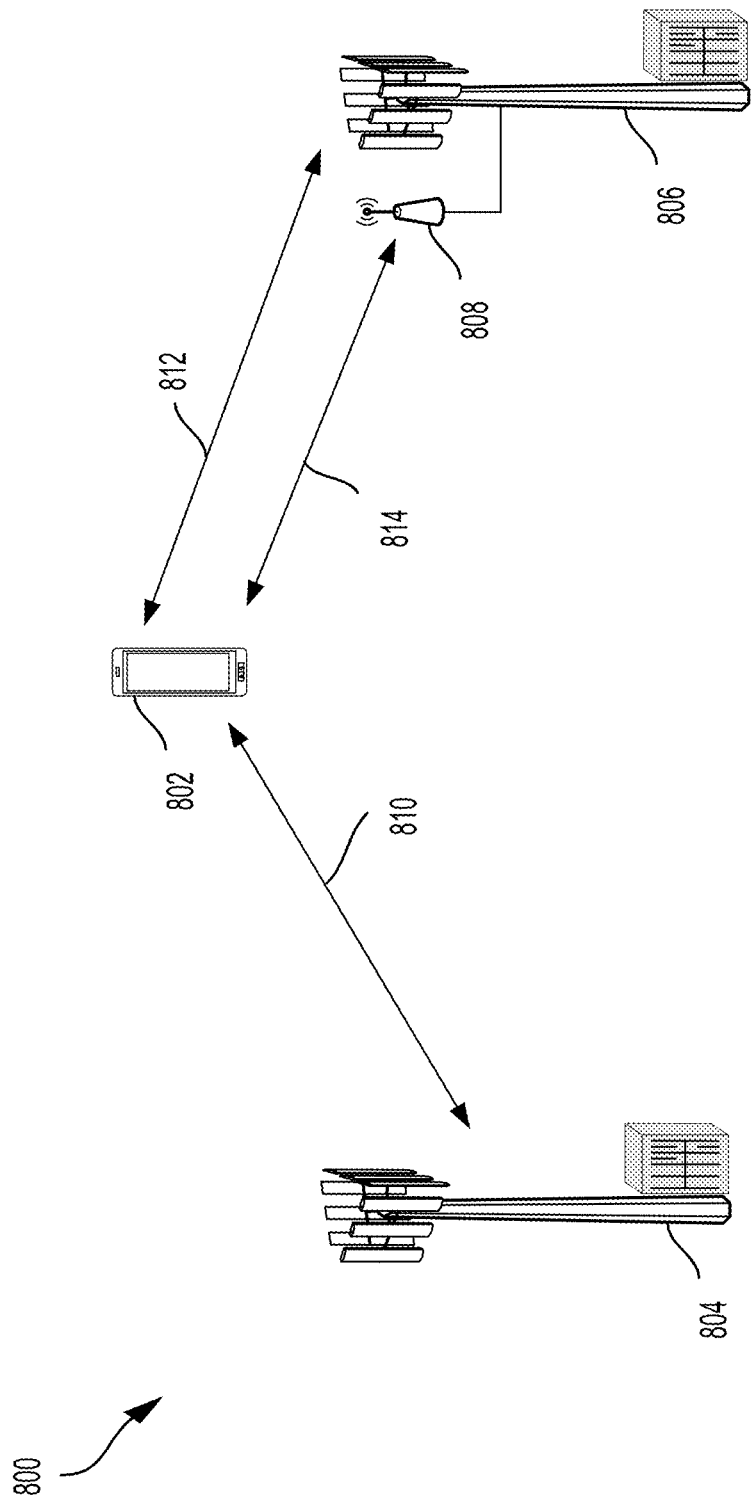

FIG. 8 is a block diagram illustrating an example of a wireless communication system 800 that supports estimating features of one band based on measurements of another band, in accordance with aspects of the present disclosure. In the example of FIG. 8, the wireless communication system 800 includes a UE 802, a first base station 804 operating in a first band, a second base station 806 operating in a second band, and a reduced-functionality transceiver 808 operating in the first band. The UE 802 is configured for operating in both the first and the second bands. The first base station 804 and second base station 806 are examples of TRPs. In some examples, the first band is within FR1 and the second band is within FR2. Performing measurements in FR1 to estimate one or more features of FR2 may reduce beam management overhead or reduce the UE 802 power consumption.

In the example of FIG. 8, the reduced-functionality transceiver 808 is collocated with, and specifically at a same location as, the second base station 806. In such examples, the reduced-functionality transceiver 808 is integrated with an infrastructure of the second base station 806, such as sharing a cellular tower. In other examples, as described above, a distance between a location of the reduced-functionality transceiver 808 and a location of the collocated second base station 806 may be less than a distance threshold apart. As described above, the reduced-functionality transceiver 808 may be a reduced-functionality transceiver.

The UE 802 and the first base station 804 may exchange uplink (UL) and downlink (DL) communications 810 via a first band, and the UE 802 and the second base station 806 may exchange UL and DL communications 812 via a second band that may not overlap the first band. The DL communications 810 and 812 may include, for example, one or more reference signals, synchronization signals, control information, and/or data information, such as in the form of packets, carried via various channels including control channels (for example, a physical downlink control channel (PDCCH)) and data channels (for example, a physical downlink shared channel (PDSCH)). In some examples, the reduced-functionality transceiver 808 may not transmit data via data channels. The UL communications 810 and 812 may include, for example, reference signals, control information, and data, such as in the form of packets, carried via various channels including control channels (for example, a physical uplink control channel (PUCCH)) and data channels (for example, a physical uplink shared channel (PUSCH)).

In various examples, the UE 802 may transmit UL communications or signals 814 to the reduced-functionality transceiver 808 via the first band. For example, reduced-functionality transceiver 808 may transmit an on-demand RS, such as a channel state information reference signal (CSI-RS), a synchronization signal block (SSB), or a pathloss (PL) RS. As described above, the reduced-functionality transceiver 808 may not include capabilities for transmitting some DL communications, such as data transmitted via a PDSCH or reference signals for demodulating data symbols. Additionally, the reduced-functionality transceiver 808 may not include capabilities for receiving some UL communications including some reference signals that would typically be transmitted to a base station. For example, the reduced-functionality transceiver 808 may not be capable of receiving, or may be disabled from receiving, data, such as data transmitted via a PUSCH, or reference signals for demodulating data symbols. Rather, the reduced-functionality transceiver 808 may receive stand-alone reference signals, such as sounding reference signals (SRSs) transmitted by the UE 802. In some such examples, the reduced-functionality transceiver 808 may estimate UL channel characteristics or UL timing based on the SRSs. A channel quality is an example of a channel characteristic. In some examples, the reduced-functionality transceiver 808 is a node of a terrestrial beacon system. In such examples, the reduced-functionality transceiver 808 may receive SRSs from the UE 802 in response to a DL positioning reference signal (PRS) transmitted to the UE 802 by the reduced-functionality transceiver 808. In some other examples, the reduced-functionality transceiver 808 may not be limited to a node of a terrestrial beacon system. For example, the reduced-functionality transceiver 808 may be another type of reduced-functionality transceiver for transmitting information to the UE 802. The reduced-functionality transceiver 808 may communicate with one or both of base stations 804 and 806 via a backhaul connection (not shown in FIG. 8).

As described above, the reduced-functionality transceiver 808 may additionally or alternatively transmit an SSB to the UE 802. In some examples, the SSB may be an off-synchronization raster SSB that is not included within a synchronization raster. In such examples, the off-synchronization raster SSB is not included within a frequency position of a synchronization block used for system acquisition. In other examples, the SSB may be a non-cell defining SSB, in which a cell ID is not associated with the SSB. In various examples, the SSB may be used to obtain power delay profile (PDP) estimates, or other information, such as a received signal power. In some examples, bits within a master information block (MIB) may indicate to the UE 802 that the SSB is to be used for measurements of the first band, such as PDP estimates, in addition to, or as an alternate to, synchronization or cell definition. In some examples, in addition to, or as an alternate to, estimating the PDP based on the SSB, the UE 802 may estimate the PDP based on a CSI-RS transmitted by the reduced-functionality transceiver 808. In either or both cases, the UE 802 may estimate a received signal power based on the PDP.

Aspects of the present disclosure do not limit the reduced-functionality transceiver 808 to transmitting only the CSI-RS, SSB, and PRS. The reduced-functionality transceiver 808 may transmit other types of reference signals that do not correspond to demodulating data symbols.

The first or second base stations 804 and 806 may determine power control information for adjusting the UE transmit power from the UE power headroom (PHR) and the UE location. The first or second base stations 804 and 806 may transmit downlink pathloss (PL) reference signals (RSs) to the UE 802. A change in PL between multiple downlink PL RSs transmitted by one of the base stations 804 and 806 may trigger the UE 802 to transmit a PHR report to the base station 804 or 806. The PHR transmitted in response to the change in PL is an example of a PL-based PHR report.

In some implementations, the first or second base stations 804 and 806 may determine power control information for adjusting the transmit power of the UE 802 based on the power headroom (PHR) and the location of the UE 802. The first or second base stations 804 and 806 may transmit DL pathloss (PL) reference signals (RSs) to the UE 802. A change in PL between multiple DL PL RSs transmitted by one of the base stations 804 and 806 may trigger the UE 802 to transmit a PHR report to the base station 804 or 806. In such examples, in which the UE 802 transmits the PHR report in response to the change in PL, the PHR report is an example of a PL-based PHR report.

As indicated above, in some examples, the reduced-functionality transceiver 808 is not capable of transmitting DL PL RSs for triggering a PL-based PHR report. In such examples, the first base station 804 may configure the UE 802 for periodic PHR reporting. Based on such a periodic PHR reporting configuration, the UE 802 may periodically transmit the PHR report for UL transmissions to the reduced-functionality transceiver 808 to the first base station 804. Additionally, or alternatively, the UE 802 may include the PHR report intended for UL transmissions to the reduced-functionality transceiver 808 in a PL-based PR report triggered by DL PL RSs transmitted by the first base station 804. The first base station 804 may use the UE 802 location and the PHR report intended for UL transmissions to the reduced-functionality transceiver 808 to adjust a transmit power of transmissions from the UE 802 to the reduced-functionality transceiver 808. For example, the transmit power for transmissions from the UE 802 to the reduced-functionality transceiver 808 may be advantageously adjusted to a value to overcome interference from the second base station 806 while preventing saturation at the reduced-functionality transceiver 808.

As also indicated above, the reduced-functionality transceiver 808 may not be capable of transmitting a DL reference signal for SRS beam spatial relations. In some examples in which the first band is within a first frequency range (for example, FR1) and the second band is within a second frequency range (for example, FR2), SRS transmissions from the UE 802 in the first band and second band may not be beamformed. That is, the SRS transmissions may be isotropic. In other examples in which the first band operates within a second frequency range (for example, FR2) and the second band operates within a frequency range that is higher than the second frequency range, such as frequency range four (FR4), the SRS transmissions from the UE 802 may be beamformed in both bands. Additionally, in such examples in which the first band operates within FR2 and the second band operates within a frequency range that is greater than FR2, cross-frequency quasi-collocation (QCL) information may be transmitted to the UE 802 for identifying SRS beams in the first band that are quasi-collocated with SRS beams in the second band. That is, both UL transmissions are beamformed. The UE 802 may use the QCL information of the second band to beamform SRSs towards the reduced-functionality transceiver 808.

As described, the reduced-functionality transceiver 808 may not be capable of transmitting DL PL RSs for triggering a PL-based PHR report. In some examples, the UE 802 may be configured to form and sweep its own UL beams to identify SRS beams. In such examples, the UE 802 may transmit SRSs to the reduced-functionality transceiver 808 and the second base station 806 via the identified SRS beams.

As similarly described above, the reduced-functionality transceiver 808 may also not be capable of transmitting DL RSs for synchronization, such as timing tracking. In some such examples, the UE 802 determines a timing for UL transmissions to the reduced-functionality transceiver 808 from one or more other transmissions of another wireless communication device. For example, the timing for the UL transmissions from the UE 802 to the reduced-functionality transceiver 808 may be determined from one or more DL RSs of one or more component carriers (CCs) in a timing advance group (TAG). Additionally, the reduced-functionality transceiver 808 may not be capable of transmitting DL RSs for frequency tracking. In some implementations, the UE 802 determines a frequency of UL transmissions to the reduced-functionality transceiver 808 is determined from a reference frequency of a supplementary uplink (SUL).

As described above, the UE 802 may transmit an on-demand RS request soliciting the reduced-functionality transceiver 808 to transmit an on-demand RS to the UE 802. In some aspects, the UE 802 receives configuration information for one or more RSs. The configuration information may provide information for transmitting the one or more RSs to the reduced-functionality transceiver 808 and/or receiving the one or more RSs from the reduced-functionality transceiver 808. In such aspects, the configuration information may be transmitted from the first base station 804 to the UE 802. The on-demand RS may be a channel measurement reference signal, a synchronization reference signal, or a positioning reference signal. The reduced-functionality transceiver 808 may transmit the on-demand RS, in the first band, in response to receiving the on-demand RS request. In some aspects, the reduced-functionality transceiver 808 receives configuration information for one or more RSs. The configuration information may provide information for transmitting the one or more RSs to the UE 802 and/or receiving the one or more RSs from the UE 802. In such aspects, the configuration information may be transmitted from the first base station 804 to the reduced-functionality transceiver 808. According to aspects of the present disclosure, a radio resource control (RRC) configuration does not configure periodic RS transmissions from the reduced-functionality transceiver 808 to the UE 802.

Additionally, or alternatively, the UE 802 receives an on-demand RS request from the reduced-functionality transceiver 808. The on-demand RS request solicits the UE 802 to transmit an on-demand RS to the reduced-functionality transceiver 808. The on-demand RS may be an SRS. The UE 802 may transmit the on-demand RS in the first band, in response to receiving the on-demand RS request.

As described below, a machine learning model, such as a machine learning model implemented via an SoC 300 as described in FIG. 3, may be trained for use in estimating one or more features of the second band based on measurements of the reference signal received in the first band. The features may include one, some, or all of one or more channel characteristics, a received signal power, or a beam direction, among other examples. The one or more estimated features are a type of prediction generated by the machine learning model. The SoC implementing the machine learning model may be a component of one or more of the UE 802, the first base station 804, the second base station 806, or the reduced-functionality transceiver 808. In other words, whichever one or more of the UE 802, the first base station 804, the second base station 806, or the reduced-functionality transceiver 808 is configured to perform the estimation of the features may include hardware or software for implementing the machine learning model. The machine learning model implemented by the SoC may be a type of neural network. For example, the machine learning model may be a convolutional neural network, a deep convolutional neural network, or another type of neural network.

In some examples in which the machine learning model is implemented in the reduced-functionality transceiver 808, the reduced-functionality transceiver 808 estimates one or more features of the second band based on measurements it performs on the on-demand RS transmitted in the first band from the UE 802. In response to estimating the one or more features, the reduced-functionality transceiver 808 may transmit a report including indications of the one or more estimated features to the second base station 806 via a backhaul link (not shown in FIG. 8). The second base station 806 may select or otherwise manage parameters for a DL beam or a channel for transmissions to the UE 802 based on one or more of the estimated features. For example, the second base station 806 may adjust a DL beam direction based on the estimated features.

In some examples in which the machine learning model is implemented in the UE 802, the UE 802 estimates one or more features of the second band based on measurements it performs on the on-demand RS transmitted in the first band from the reduced-functionality transceiver 808. In response to estimating the one or more features, the UE 802 may transmit a report including indications of the one or more estimated features to the second base station 806 via a backhaul link (not shown in FIG. 8). The second base station 806 may select or otherwise manage parameters for a DL beam or a channel for transmissions to the UE 802 based on one or more of the estimated features. For example, the second base station 806 may adjust a DL beam direction based on the estimated features.

In some examples, in which the model is implemented in the second base station 806, the reduced-functionality transceiver 808 or the UE 802 may transmit a report including measurements of the on-demand RS received in the first band to the second base station 806 via a backhaul link (not shown in FIG. 8). For example, the reduced-functionality transceiver 808 may forward the measurements of the SRS received from the UE 802 in the first band to the second base station 806. The second base station 806 may estimate one or more features of the second band based on the forwarded reference signal measurements. The second base station 806 may select or otherwise manage parameters for a beam or a channel based on one or more of the estimated features. For example, the second base station 806 may adjust a beam direction based on the estimated features.

In various examples, the machine learning model may be trained, prior to deployment, during a training phase. In the training phase, the machine learning model learns to estimate features of the second band based on measurements of a signal received in the first band. In some examples, during the training phase, the machine learning model receives measurements performed on a training signal. In some aspects, the training signal may be transmitted in a first band from the UE 802 or another wireless communication device (for example, a dedicated training UE not shown in FIG. 8) to the reduced-functionality transceiver 808. In other aspects, the training signal may be transmitted in a first band from the reduced-functionality transceiver 808 or another wireless communication device (for example, a dedicated training transceiver not shown in FIG. 8) to the UE 802. The machine learning model may be used to estimate one or more features in the second band based on the measurements performed on the training signal. The estimated features may be compared with ground truth labels. In some examples, actual features, such as an actual signal strength, beam direction, or channel characteristics of the second band are indicated by the ground truth labels. In some aspects, the machine learning module is trained to reduce a loss between the estimated features and the ground truth labels. In some examples, the reduced-functionality transceiver 808 or UE 802 may share the trained machine learning model with one or both of the first base station 804 and the second base station 806.

Some aspects of the present disclosure improve various functions of a wireless network, such as secondary cell group (SCG) selection or cell reselection, based on measurements of a first band. In one configuration, when the UE measures reference signals in a first band, the measurements may be leveraged to determine whether the UE should connect to a TRP operating in a second band. In some implementations, the UE is not in a connected mode with both a TRP operating in the first band and another TRP operating in the second band.

As described above, in some implementations, features of a second band are estimated from measurements of a reference signal received in a first band. The reference signal may be transmitted by a TRP operating in the first band. The TRP may be collocated with another TRP operating in a second band. In one implementation, a UE is connected with a first TRP in a first band. The first TRP may transmit assistance information providing collocation information for the first TRP and one or more second TRPs operating in a second band. That is, the assistance information may explicitly notify the UE that the first TRP is collocated with one or more of the second TRPs. The collocation information for the first TRP and the one or more second TRPs may be provided for a secondary cell group (SCG) setup.

Additionally, or alternatively, the first TRP may transmit assistance information providing collocation information for one or more third TRPs operating in the first band and one or more second TRPs operating in the second band. That is, the assistance information may explicitly notify the UE that one or more third TRPs are collocated with the one or more second TRPs. The collocation information for the one or more third TRPs and the one or more second TRPs may be provided for cell reselection or mobility. That is, based on the collocation information, the UE may switch from a current cell of the first TRP to a cell of one of the third TRPs or a cell of one of the second TRPs.

In one implementation, the first TRP transmits the assistance information in a system information block (SIB). Based on the assistance information, the UE may identify a first physical cell ID (PCI) operating in one band that is collocated with a second PCI operating in a different band. In one configuration, the UE estimates one or more features of one or more second TRPs operating in the second band based on measurements performed on a reference signal (RS) transmitted from a TRP operating in the first band. The one or more features may include, but are not limited to, channel characteristics, signal strength, or beam direction. The reference signal may be, for example, a channel measurement RS (for example, channel state information reference signal (CSI-RS), a synchronization RS (for example, a synchronization signal block (SSB), or a positioning RS (for example, a downlink positioning reference signal (DL PRS)). In one configuration, the UE receives configuration information for one or more reference signals. The configuration information may provide information for transmitting the one or more reference signals to the TRP and/or receiving the one or more reference signals from the TRP.

The collocated TRPs may be located at a same location. Alternatively, the collocated TRPs may be at different locations, where a location of the one or more TRPs operating in a first band is near, (in other words, less than a distance threshold) from a location of the one or more TRPs operating in a second band. For example, the distance threshold may be ten meters. In this example, the first TRP operating in the first band may be collocated with a second TRP operating in the second band if the first TRP is at a location that is less than ten meters from a location of the second TRP.

In conventional systems, a neighbor list may be explicitly signaled to the UE. Conventional systems do not provide inter-band collocation information to the UE. Additionally, in conventional systems, the UE may implicitly infer collocation information by performing positioning operations across different bands. As discussed, the inter-band collocation information is not explicitly provided to the UE.

Figure 9A:
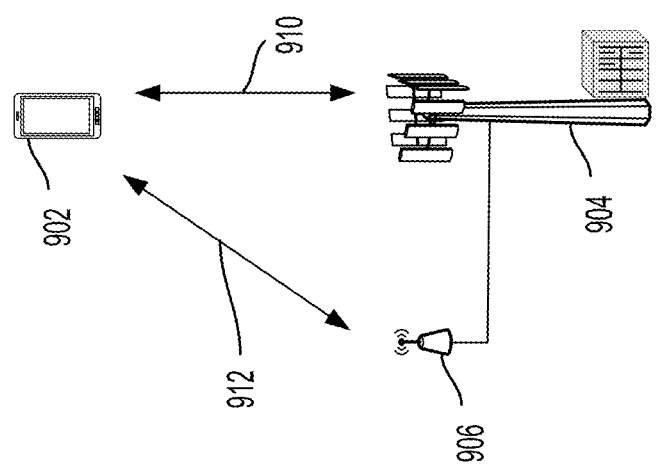

FIG. 9A illustrates an example of a wireless system 900, according to aspects of the present disclosure. In the example of FIG. 9A, the wireless system 900 includes a UE 902, a first base station 904 operating in a first band, and a second base station 906 operating in a second band that does not overlap the first band. The first base station 904 and second base station 906 are examples of TRPs.

Figure 9B:
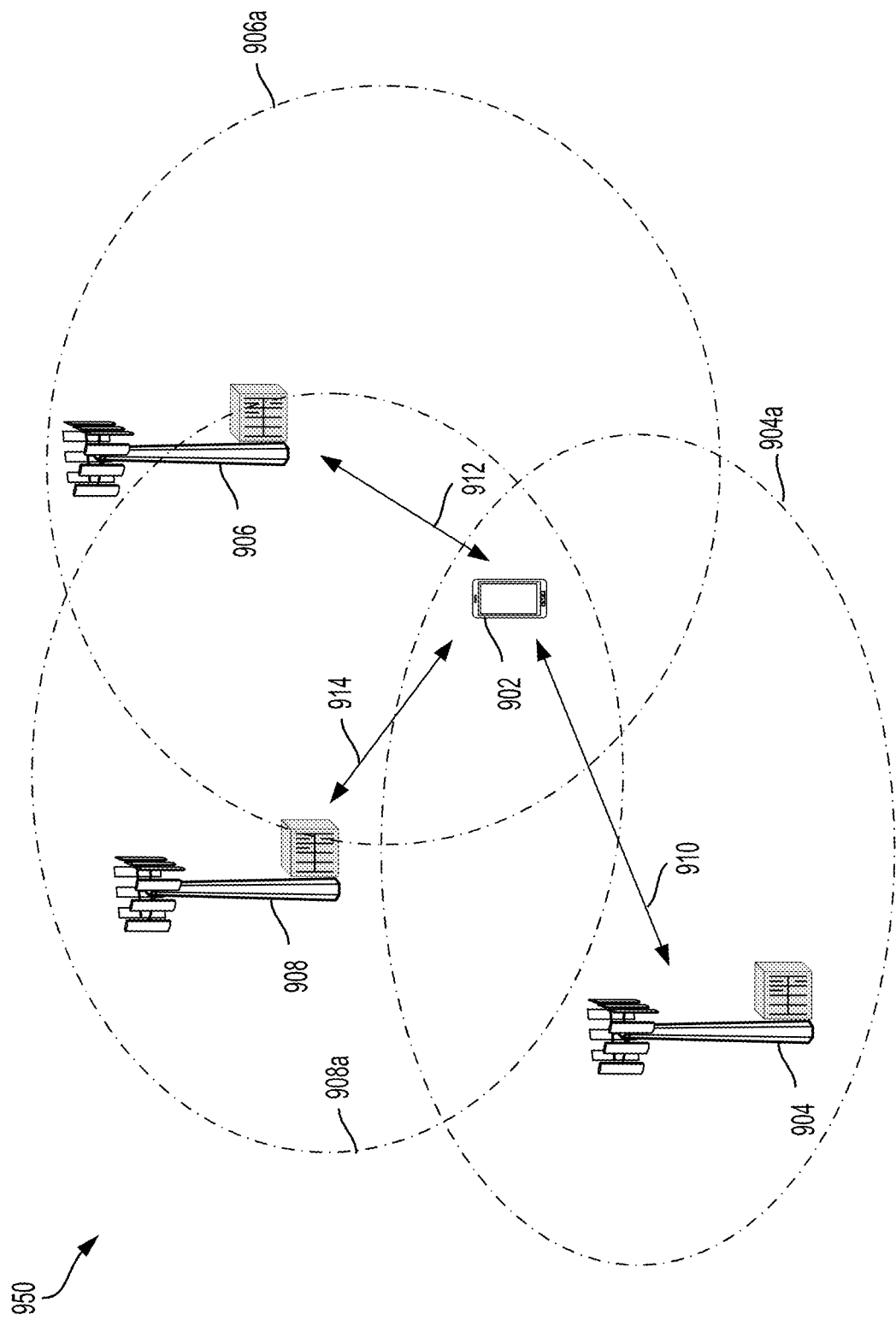

In the example of FIG. 9A, the first base station 904 is collocated with the second base station 906. That is, a distance between a location of the first base station 904 and a location of the second base station 906 is less than a threshold distance. Alternatively, the first base station 904 is defined on the same infrastructure as the second base station 906. Aspects of the present disclosure are not limited to only one second base station 906 being collocated with the first base station 904. Multiple second base stations 906 may be collocated with the first base station 904. For brevity, only one second base station 906 is illustrated in FIG. 9A. Additionally, FIGS. 9A and 9B are not drawn to scale.

According to aspects of the present disclosure, the UE 902 may send and receive information 910 with the first base station 904 via one or more frequencies of a first band. Additionally, the UE 902 may send and receive information 912 with the second base station 906 via one or more frequencies of a second band. As described above, the first band may operate in a first frequency range (for example, FR1) and the second band may operate in a second frequency range (for example, FR2).

A machine learning model or another function may use measurements of a reference signal, such as a channel state information reference signal (CSI-RS), or a sounding reference signal (SRS), received in a first band to estimate one or more features of the second band. The machine learning model may be included in one or more of the UE 902, first base station 904, or the second base station 906.

In the example of FIG. 9A, the UE 902 is connected to the first base station 904 in the first band. The first base station 904 transmits assistance information to the UE 902 providing collocation information of the first base station 904 and the second base station 906. That is, based on the assistance information, the UE 902 is informed that the first base station 904 is collocated with the second base station 906. The assistance information may be transmitted in a SIB.

After receiving the assistance information, the UE 902 may measure a reference signal transmitted by the first base station 904. The measurements may be input to a machine learning model to estimate one or more features of the second band. The one or more estimated features are a type of prediction generated by the machine learning model. The one or more estimated features include, at least, channel conditions, received signal power, or beam direction. The UE 902 may add the second base station 906 as a candidate for SCG setup when one or more estimated features satisfy a condition for an SCG. For example, the UE 902 adds the second base station 906 as a candidate for SCG setup when the estimated received signal power is greater than a signal power threshold.

FIG. 9B illustrates an example of a wireless system 950, according to aspects of the present disclosure. In the example of FIG. 9B, the wireless system 950 includes a UE 902, a first base station 904 operating in a first band, a third base station 908 operating in the first band, and a second base station 906 operating in a second band that does not overlap the first band. Each base station 904, 906, 908 may be associated with a different cell 904A, 909A, 908A, respectively. The first base station 904, second base station 906, and third base station 908 are examples of TRPs.

In the example of FIG. 9B, the third base station 908 is collocated with the second base station 906. That is, a distance between a location of the third base station 908 and a location of the second base station 906 is less than a threshold distance. Alternatively, as discussed, third base station 908 may be defined on the same infrastructure as the second base station 906. Aspects of the present disclosure are not limited to only one second base station 906 collocated with only one third base station 908. One or more second base stations 906 may be collocated with one or more third base stations 908. For brevity, only one second base station 906 and one third base station 908 are illustrated in FIG. 9B.

According to aspects of the present disclosure, the UE 902 may send and receive information 910 with the first base station 904 via the first band. Additionally, the UE 902 may send and receive information 912 with the second base station 906 via the second band. The UE 902 may also send and receive information 914 with the third base station 908 via one or more frequencies of the first band.

A machine learning model or another function may use measurements of a reference signal, such as a CSI-RS, received in a first band to estimate one or more features of the second band. The machine learning model may be included in one or more of the UE 902, first base station 904, the second base station 906, or the third base station 908.

In the example of FIG. 9B, the UE 902 is connected to the first base station 904 in the first band. The first base station 904 may provide the PCIs of neighboring base stations, such as the second and third base stations 906 and 908. Additionally, in FIG. 9B, the first base station 904 transmits assistance information to the UE 902 providing collocation information of the third base station 908 and the second base station 906. That is, based on the assistance information, the UE 902 may determine that a PCI of the third base station 908 is collocated with a PCI of the second base station 906. The assistance information may be transmitted in a SIB.

After receiving the assistance information, the UE 902 may measure a reference signal transmitted by the third base station 908. Based on the measurements of the third base station 908, the UE 902 may add the third base station 908 to a list of candidates for first band cell reselection. The cell reselection may be performed if conditions of the current cell 904*a* fall below a threshold. Additionally, the measurements of the reference signal may be input to a machine learning model to estimate one or more features of the second band. The one or more estimate features include, at least, channel conditions, received signal power, or beam direction. Based on the one or more estimated features of the second base station 906, the UE 902 may add the third base station 908 to a list of candidates for second band cell reselection. That is, rather than directly measuring signals transmitted from the second base station 906, the UE 902 may predict one or more features of the second band based on measurements of a reference signal transmitted in the first band.

In FIGS. 9A and 9B, as an example, the first band operates in a first frequency range (for example, FR1) and the second band operates in a second frequency range (for example, FR2). Additionally, in FIGS. 9A and 9B the first base station 904 and third base station 908 operate on one or more frequencies in an LTE radio access technology (RAT) band or a sub-6 GHz band. The second base station 906 may operate on one or more frequencies of a millimeter wave (mmWave) band or a band different from the first base station's 904 band.

The UE 902, first base station 904, second base station 906, and third base station 908 may use a machine learning model, such as a convolutional neural network, to estimate the one or more features of the second band based on measurements of a first band. For example, if the model is in the UE 902, during a training phase, the model may be trained via training signals received in the first band from the first base station 904 or the third base station 908. The actual measurements in the second band are ground truth labels. The machine learning module is trained to reduce a loss between the estimated features and the ground truth labels.

The model may be trained offline. The models in the first, second, or third base stations 904, 906, and 908 may be provided instead of, or in addition to, the model of the UE 902.

Figure 10:
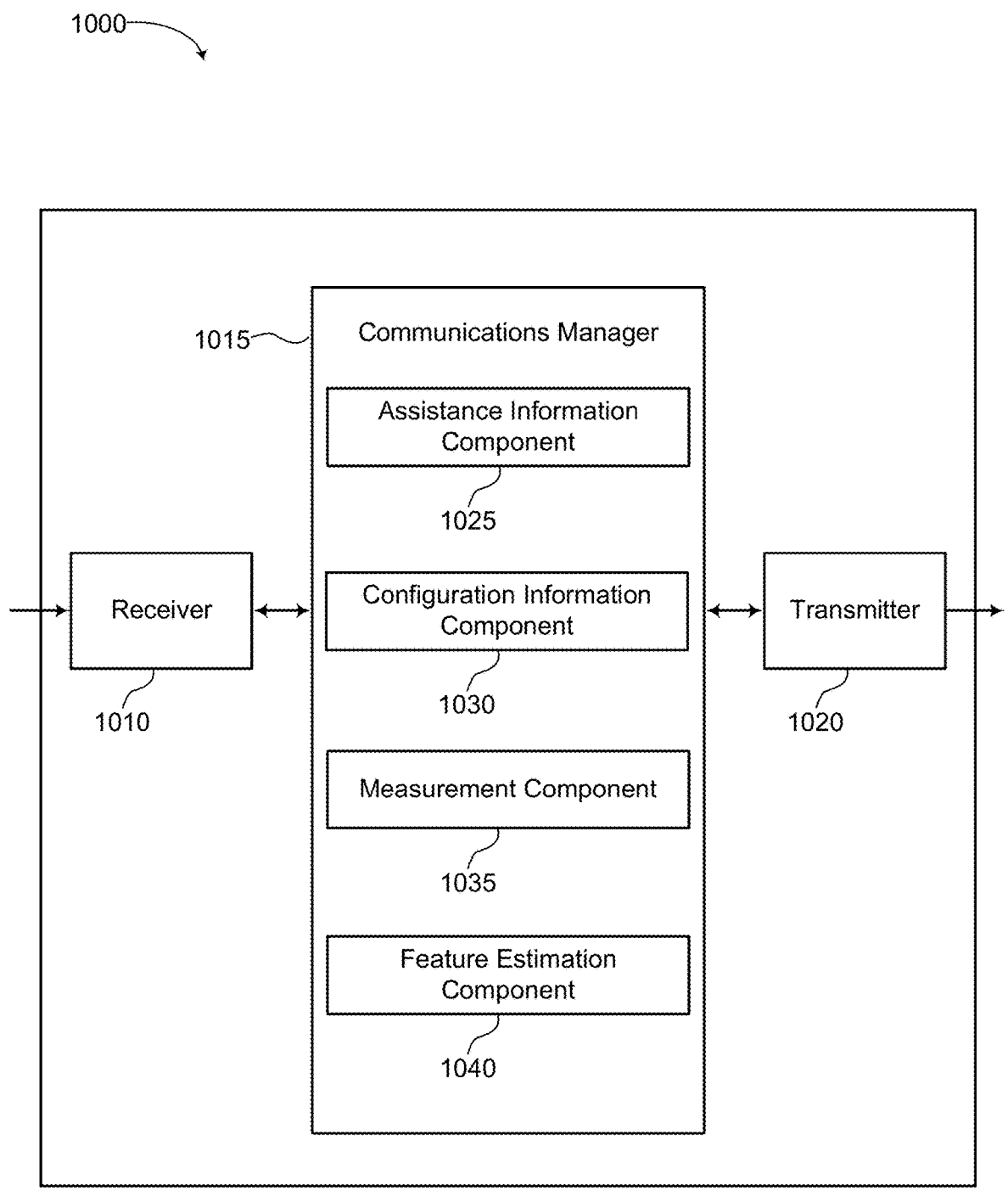
FIG. 10 is a block diagram illustrating an example of a wireless communication device that supports estimating features of one band based on measurements of another band, in accordance with aspects of the present disclosure.

FIG. 10 shows a block diagram of a wireless communication device 1000 that supports estimating features of one band based on measurements of another band in accordance with aspects of the present disclosure. The wireless communication device 1000 may be an example of aspects of a UE 120a, 120b, 120c, 120d, 120e, 602, 702, 809, 902 described with reference to FIGS. 1, 6, 7, 8, 9A, and 9B. The wireless communication device 1000 may include a receiver 1010, a communications manager 1015, and a transmitter 1020, which may be in communication with one another (for example, via one or more buses). In some examples, the wireless communication device 1000 is configured to perform operations, including operations of the process 1100 described below with reference to FIG. 11.

In some examples, the wireless communication device 1000 can include a chip, SoC, chipset, package, or device that includes at least one processor and at least one modem (for example, a 5G modem or other cellular modem). As an example, the wireless communication device 1000 can include an SoC 300, as described in FIG. 3. In some examples, the communications manager 1015, or its subcomponents, may be separate and distinct components. In some examples, at least some components of the communications manager 1015 are implemented at least in part as software stored in a memory. For example, portions of one or more of the components of the communications manager 1015 can be implemented as non-transitory code executable by the processor to perform the functions or operations of the respective component.

The receiver 1010 may receive one or more reference signals (for example, periodically configured CSI-RSs, aperiodically configured CSI-RSs, or multi-beam-specific reference signals), synchronization signals (for example, SSBs), control information, and/or data information, such as in the form of packets, from one or more other wireless communication devices via various channels including control channels (for example, a PDCCH) and data channels (for example, a PDSCH). The other wireless communication devices may include, but are not limited to, a first base station 604, 704, 804, 904, a second base station 606, 706, 806, 906, a dedicated transmitter 608, a dedicated receiver 708, a reduced-functionality transceiver 808, or a third base station 908 described with reference to FIGS. 6, 7, 8, 9A, and 9B. In aspects of the present disclosure, the dedicated transmitter 608 does not include receiver functionality. Additionally, the dedicated transmitter's functionality may be limited to only transmitting channel measurement reference signals, synchronization reference signals, or positioning reference signals. The dedicated transmitter 608 may not transmit data information, such as information transmitted via a PDSCH, and reference signals corresponding to data transmissions, such as a demodulation reference signal (DMRS). Additionally, in some aspects of the present disclosure, the reduced-functionality transceiver 808 may be limited to transmitting or receiving channel measurement reference signals, synchronization reference signals, or positioning reference signals. The reduced-functionality transceiver 808 may not transmit or receive data information, such as information transmitted via a PDSCH, and reference signals corresponding to data transmissions, such as a DMRS. Furthermore, in some aspects of the present disclosure, the dedicated receiver 708 does not include transmitter functionality. Additionally, the dedicated receiver's 708 functionally may be limited. For example, the dedicated receiver 708 may not receive data information, such as information transmitted via a PUSCH, and reference signals for demodulating data symbols.

The received information may be passed on to other components of the wireless communication device 1000. The receiver 1010 may be an example of aspects of the receive processor 258 described with reference to FIG. 2. The receiver 1010 may include a set of radio frequency (RF) chains that are coupled with or otherwise utilize a set of antennas (for example, the set of antennas may be an example of aspects of the antennas 252a through 252r described with reference to FIG. 2).

The transmitter 1020 may transmit signals generated by the communications manager 1015 or other components of the wireless communication device 1000. In some examples, the transmitter 1020 may be collocated with the receiver 1010 in a transceiver. The transmitter 1020 may be an example of aspects of the transmit processor 264 described with reference to FIG. 2. The transmitter 1020 may be coupled with or otherwise utilize a set of antennas (for example, the set of antennas may be an example of aspects of the antennas 252a through 252r described with reference to FIG. 2), which may be antenna elements shared with the receiver 1010. In some examples, the transmitter 1020 is configured to transmit control information in a PUCCH and data in a PUSCH.

The communications manager 1015 may be an example of aspects of the controller/processor 280 described with reference to FIG. 2. The communications manager 1015 includes an assistance information component 1025, a configuration information component 1030, a measurement component 1035, and a feature estimation component 1040.

The assistance information component 1025 is configured to receive assistance information indicating a dedicated transmitter collocated with a second base station. The assistance information may be received at the receiver 1010 from a first base station (for example, a first TRP) operating within a first band. The assistance information may be received in a SIB. The configuration information component 1030 is configured to use the assistance information to identify a signal transmitted in the first band by the dedicated transmitter. The signal may be received at the receiver 1010. The signal may be a reference signal (for example, CSI-RS), a synchronization signal (for example, SSB), or a positioning signal (for example, a PRS).

Working in conjunction with the receiver 1010, the configuration information component 1030 is configured to receive configuration information for one or more reference signals associated with another wireless communication node. The configuration information may configure the wireless communication device 1000 to receive the one or more reference signals from the other wireless communication device and/or transmit the one or more reference signals to the other wireless communication device.

The measurement component 1035 may be an optional component. In some implementations, the measurement component 1035 is configured to perform one or more measurements based on the received signal. For example, the measurement component 1035 may estimate a PDP from a received signal. A received signal power may be estimated based on the estimated PDP. The feature estimation component 1040 may be an optional component. In some implementations, the feature estimation component 1040 is configured to estimate one or more features of the second band based on the one or measurements performed by the measurement component 1035. The one or more features may include a channel characteristic or a beam direction. Working in conjunction with the transmitter 1020, the feature estimation component 1040 may transmit the estimated features to the first or second base station. The second base station may adjust one or more characteristics of downlink transmissions based on the predicted features. The feature estimation component 1040 may be a trained machine learning model. The feature estimation component 1040 may be an example of the deep convolutional network 400 and 550 described with reference to FIGS. 4D and 5.

Figure 11:
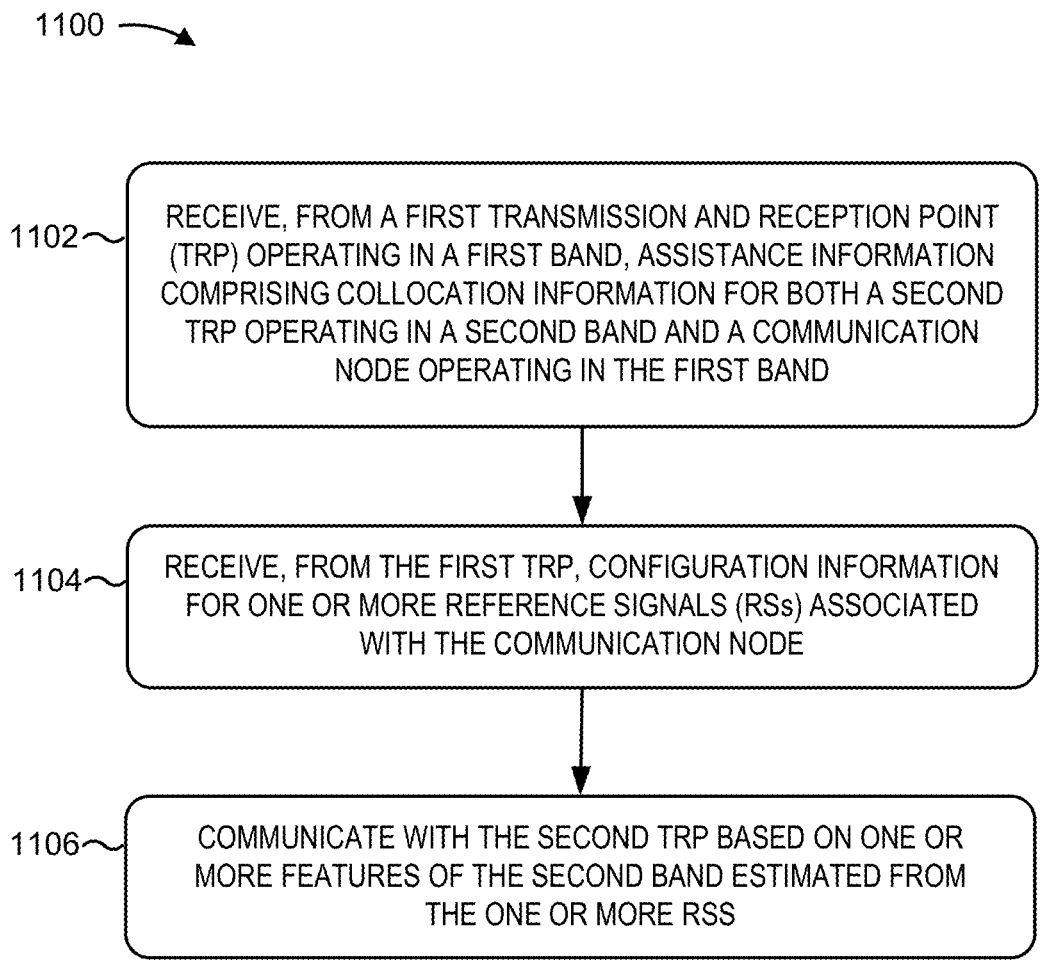
FIG. 11 is a flowchart illustrating an example process performed at a UE that supports estimating features of one band based on measurements of another band, in accordance with various aspects of the present disclosure.

FIG. 11 shows a flowchart illustrating a process 1100 that supports estimating features of one band based on measurements of another band in accordance with aspects of the present disclosure. The operations of the process 1100 may be implemented by a UE, such as a UE 120*a*, 120*b*, 120*c*, 120*d*, 120*e*, 602, 702, 802, or 902, or its components, as described with reference to FIGS. 1, 6, 7, 8, 9A, and 9B. For example, operations of the process 1100 may be performed by a communications manager 1015 as described with reference to FIG. 10. In some examples, a UE may execute a set of instructions to control the functional elements of the UE to perform the operations or functions described below. Additionally, or alternatively, a UE may perform aspects of the operations or functions described below using special-purpose hardware.

In block 1102, the UE, receives, from a first TRP operating in a first band, assistance information comprising collocation information for both a second TRP operating in a second band and a communication node operating in the first band. In some aspects, a second band does not overlap the first band. In block 1104, the UE, receives, from the first TRP, configuration information for one or more RSs associated with the communication node. The configuration information may configure the UE to transmit the one or more RSs to the communication node and/or receive the one or more RSs from the communication node.

In block 1106, the UE communicates with the second TRP based on one or more features of the second band estimated from the one or more RSs. The one or more features may include a channel characteristic, a beam direction, or a received signal power. As previously described, a channel quality may be an example of a channel characteristic. In some implementations, a trained machine learning model of the UE estimates the one or more features of the second band based on the performed measurements. In some examples, such as the example of FIG. 11, the machine learning model is implemented in the UE. In other examples, the machine learning model is implemented in one or both of the first TRP or the second TRP. In some examples, the machine learning model implemented in one or both of the first TRP or the second TRP is implemented in addition to, or as an alternate to, the machine learning model implemented in the UE. In some examples, the UE shares the trained model with one or both of the first TRP or the second TRP.

Implementation examples are described in the following numbered clauses:

1. A method of wireless communication, by a user equipment (UE), comprising:
   receiving, from a first transmission and reception point (TRP) operating in a first band, assistance information comprising collocation information for both a second TRP operating in a second band and a communication node operating in the first band;
   receiving, from the first TRP, configuration information for one or more reference signals (RSs) associated with the communication node; and
   communicating with the second TRP based on one or more features of the second band estimated from the one or more RSs.

2. The method of clause 1, further comprising:
   transmitting, to the communication node, an on-demand RS request soliciting the communication node to transmit the one or more RSs to the UE in the first band;
   receiving, from the communication node, the one or more RSs in the first band in response to the on-demand RS request;
   estimating the one or more features of the second band based on measurements of the one or more RSs, the one or more features comprising at least a channel characteristic, a received signal power, or a beam direction;
   transmitting a message indicating the one or more estimated features to the first TRP or to the second TRP, the first TRP being non-collocated with the second TRP; and
   receiving a downlink signal in the second band from the second TRP based on transmitting the message indicating the one or more estimated features to the first TRP or to the second TRP.

3. The method of clause 2, in which the one or more RSs comprises one of channel state information-RSs (CSI-RSs), synchronization signal block (SSBs), or pathloss (PL) RSs.

4. The method of clause 1, further comprising:
   receiving, from the communication node, an on-demand RS request soliciting the UE to transmit the one or more RSs to the communication node;
   transmitting the one or more RSs to the communication node in the first band; and
   receiving a downlink signal in the second band from the second TRP based on transmitting the one or more RSs.

5. The method of clause 1, further comprising:
   receiving, from the first TRP, a triggering signal; and
   transmitting the one or more RSs in the first band to the communication node in response to receiving the triggering signal.

6. The method of clause 5, in which:
   the triggering signal comprises downlink control information; and
   the one or more RSs comprise sounding reference signals (SRSs).

7. The method of clause 1, further comprising:
   receiving the one or more RSs in the first band from the communication node;
   identifying the one or more RSs from the communication node based on the assistance information;
   measuring the one or more RSs;
   estimating the one or more features of the second band based on the measurements of the one or more RSs, the one or more features comprise at least a channel characteristic, a beam direction, or a received signal power; and
   receiving a downlink signal in the second band from the second TRP based on receiving the one or more RSs, one or both of a beam or a channel of the second band having been adjusted based on the one or more received RSs.

8. The method of any of clauses 1-7, in which the communication node is collocated at a same location as the second TRP.

9. The method of any of clauses 1-7, in which the communication node is located at a distance from a location of the second TRP that is less than a threshold distance.

10. The method of any of clauses 1-9, in, further comprising:
   receiving, from the communication node, training signals in the first band; and
   training a machine learning model to estimate the one or more features of the second band based on the received training signals.

11. The method of any of clauses 1-10, in which the first band is within a first frequency range and the second band is within a second frequency range.

12. The method of any of clauses 1-11, wherein the first TRP operates according to a first radio access technology (RAT) and the second TRP operates according to a second RAT.

13. The method of any of clauses 1-12, further comprising receiving the assistance information in a system information block (SIB).

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication, by a user equipment (UE), comprising:
   receiving, from a first transmission and reception point (TRP) operating in a first band, a system information block (SIB) including assistance information indicating a first cell identifier (ID) associated with a second TRP operating in a second band is collocated with a communication node operating in the first band, the communication node being associated with a second cell ID, the first TRP and the second TRP being non-collocated;
   receiving, from the first TRP, configuration information for one or more reference signals (RSs) associated with the first band, the one or more RSs being transmitted from the UE to the communication node or received at the UE from the communication node; and
   communicating with the second TRP based on one or more features of the second band, the one or more features being estimated based on measurements of the one or more RSs in the first band, the one or more features including at least a channel characteristic, a received signal power, or a beam direction.

2. The method of claim 1, further comprising:
   transmitting, to the communication node, an on-demand RS request soliciting the communication node to transmit the one or more RSs to the UE in the first band;
   receiving, from the communication node, the one or more RSs in the first band in response to the on-demand RS request;
   estimating the one or more features of the second band based on measurements of the one or more RSs;
   transmitting a message indicating the one or more estimated features to the first TRP or to the second TRP; and
   receiving a downlink signal in the second band from the second TRP based on transmitting the message indicating the one or more estimated features to the first TRP or to the second TRP.

3. The method of claim 2, in which the one or more RSs comprises one of channel state information-RSs (CSI-RSs), synchronization signal block (SSBs), or pathloss (PL) RSs.

4. The method of claim 1, further comprising:
   receiving, from the communication node, an on-demand RS request soliciting the UE to transmit the one or more RSs to the communication node;
   transmitting the one or more RSs to the communication node in the first band; and
   receiving a downlink signal in the second band from the second TRP based on transmitting the one or more RSs.

5. The method of claim 1, further comprising:
   receiving, from the first TRP, a triggering signal; and
   transmitting the one or more RSs in the first band to the communication node in response to receiving the triggering signal.

6. The method of claim 5, in which:
the triggering signal comprises downlink control information; and
the one or more RSs comprise sounding reference signals (SRSs).

7. The method of claim 1, further comprising:
receiving the one or more RSs in the first band from the communication node;
identifying the one or more RSs from the communication node based on the assistance information;
measuring the one or more RSs;
estimating the one or more features of the second band based on the measurements of the one or more RSs; and
receiving a downlink signal in the second band from the second TRP based on receiving the one or more RSs, one or both of a beam or a channel of the second band having been adjusted based on the one or more received RSs.

8. The method of claim 1, in which a second physical location of the communication node is the same as a first physical location of the second TRP.

9. The method of claim 1, in which a second physical location of the communication node is less than a threshold distance from a first physical location of the second TRP.

10. The method of claim 1, further comprising:
receiving, from the communication node, training signals in the first band; and
training a machine learning model to estimate the one or more features of the second band based on the received training signals.

11. The method of claim 1, in which the first band is within a first frequency range and the second band is within a second frequency range.

12. The method of claim 1, wherein the first TRP operates according to a first radio access technology (RAT) and the second TRP operates according to a second RAT.

13. The method of claim 1, in which the communication node is a dedicated receiver, a dedicated transmitter, or a reduced functionality transceiver.

14. An apparatus for wireless communications at a user equipment (UE), comprising:
at least one processor;
at least one memory coupled with the at least one processor; and
instructions stored in the at least one memory and operable, when executed by the at least one processor, to cause the apparatus:
to receive, from a first transmission and reception point (TRP) operating in a first band, a system information block (SIB) including assistance information indicating a first cell identifier (ID) associated with a second TRP operating in a second band is collocated with a communication node operating in the first band, the communication node being associated with a second cell ID, the first TRP and the second TRP being non-collocated;
to receive, from the first TRP, configuration information for one or more reference signals (RSs) associated with the first band, the one or more RSs being transmitted from the UE to the communication node or received at the UE from the communication node; and
to communicate with the second TRP based on one or more features of the second band, the one or more features being estimated based on measurements of the one or more RSs in the first band, the one or more features including at least a channel characteristic, a received signal power, or a beam direction.

15. The apparatus of claim 14, in which execution of the instructions further cause the apparatus:
to transmit, to the communication node, an on-demand RS request soliciting the communication node to transmit the one or more RSs to the UE in the first band;
to receive, from the communication node, the one or more RSs in the first band in response to the on-demand RS request;
to estimate the one or more features of the second band based on measurements of the one or more RSs;
to transmit a message indicating the one or more estimated features to the first TRP or to the second TRP; and
to receive a downlink signal in the second band from the second TRP based on transmitting the message indicating the one or more estimated features to the first TRP or to the second TRP.

16. The apparatus of claim 15, in which the one or more RSs comprises one of channel state information-RSs (CSI-RSs), synchronization signal block (SSBs), or pathloss (PL) RSs.

17. The apparatus of claim 14, in which execution of the instructions further cause the apparatus:
to receive, from the communication node, an on-demand RS request soliciting the UE to transmit the one or more RSs to the communication node;
to transmit the one or more RSs to the communication node in the first band; and
to receive a downlink signal in the second band from the second TRP based on transmitting the one or more RSs.

18. The apparatus of claim 14, in which execution of the instructions further cause the apparatus:
to receive, from the first TRP, a triggering signal; and
to transmit the one or more RSs in the first band to the communication node in response to receiving the triggering signal.

19. The apparatus of claim 18, in which:
the triggering signal comprises downlink control information; and
the one or more RSs comprise sounding reference signals (SRSs).

20. The apparatus of claim 14, in which execution of the instructions further cause the apparatus:
to receive the one or more RSs in the first band from the communication node;
to identify the one or more RSs from the communication node based on the assistance information;
to measure the one or more RSs;
to estimate the one or more features of the second band based on the measurements of the one or more RSs; and
to receive a downlink signal in the second band from the second TRP based on receiving the one or more RSs, one or both of a beam or a channel of the second band having been adjusted based on the one or more received RSs.

21. The apparatus of claim 14, in which a second physical location of the communication node is the same as a first physical location of the second TRP.

22. The apparatus of claim 14, in which a second physical location of the communication node is less than a threshold distance from a first physical location of the second TRP.

23. The apparatus of claim 14, in which execution of the instructions further cause the apparatus:
to receive, from the communication node, training signals in the first band; and to train a machine learning model to estimate the one or more features of the second band based on the received training signals.

24. The apparatus of claim 14, in which the first band is within a first frequency range and the second band is within a second frequency range.

25. The apparatus of claim 14, wherein the first TRP operates according to a first radio access technology (RAT) and the second TRP operates according to a second RAT.

26. The apparatus of claim 14, in which the communication node is a dedicated receiver, a dedicated transmitter, or a reduced functionality transceiver.

* * * * *